(12) United States Patent
Matos

(10) Patent No.: US 7,837,143 B2
(45) Date of Patent: Nov. 23, 2010

(54) METHOD AND APPARATUS FOR DISABLING PILOT CONTROL OF A HIJACKED AIRCRAFT

(76) Inventor: Jeffrey A. Matos, 132 Hillandale Dr., New Rochelle, NY (US) 10804

( * ) Notice: Subject to any disclaimer, the term of this patent is extended or adjusted under 35 U.S.C. 154(b) by 1164 days.

(21) Appl. No.: 11/373,712

(22) Filed: Mar. 10, 2006

(65) Prior Publication Data
US 2006/0249625 A1    Nov. 9, 2006

Related U.S. Application Data

(60) Provisional application No. 60/661,563, filed on Mar. 14, 2005, provisional application No. 60/668,329, filed on Apr. 5, 2005.

(51) Int. Cl.
*B64C 13/00* (2006.01)
*B64C 19/00* (2006.01)

(52) U.S. Cl. .................................................... 244/75.1

(58) Field of Classification Search ................ 244/231, 244/76 R, 175, 195, 220, 221, 228, 230, 234
See application file for complete search history.

(56) References Cited

U.S. PATENT DOCUMENTS

| | | | | |
|---|---|---|---|---|
| 2,934,690 A * | 4/1960 | White | ................. | 318/588 |
| 3,348,644 A * | 10/1967 | Winnebago | .............. | 192/221 |
| 6,524,192 B1 * | 2/2003 | Tsujita et al. | ............... | 473/73 |
| 6,641,087 B1 * | 11/2003 | Nelson | .................... | 244/118.5 |
| 6,658,572 B1 * | 12/2003 | Craig | .................... | 726/16 |
| 6,917,863 B2 * | 7/2005 | Matos | ........................ | 701/16 |
| 6,995,688 B2 * | 2/2006 | Reynolds | .................... | 340/945 |
| 2005/0178926 A1 * | 8/2005 | Nagayama et al. | .......... | 244/221 |
| 2006/0032978 A1 * | 2/2006 | Matos et al. | ............. | 244/118.5 |
| 2007/0237641 A1 * | 10/2007 | Tsao | .................... | 416/170 R |

OTHER PUBLICATIONS

Steve Kirsch, "How to stop commercial air hijackings without inconveniencing air travelers", Mar. 6, 2005, http://web.archive.org/web/20050306175945/http://www.skirsch.com/politics/plane/disable.htm.*

* cited by examiner

*Primary Examiner*—Timothy D Collins
*Assistant Examiner*—Valentina Xavier
(74) *Attorney, Agent, or Firm*—Karl F. Milde, Jr.; Eckert Seamans Cherin & Mellott, LLC

(57) ABSTRACT

A method and apparatus are disclosed for disabling on-board pilot operation of an aircraft and transferring aircraft operation to an alternate source of control. The aircraft has at least one manually actuated control device for controlling at least one mechanical actuator, with the actuator causing movement of an aircraft attitude control surface or an aircraft engine throttle. The control device is mechanically connected to the actuator(s). The alternate source of control may be one or more of an autopilot, a flight control system and an off-aircraft human pilot. The method and apparatus for disabling on-board pilot operation provides for (a) receiving a signal indicative of an emergency condition requiring the disabling of on-board pilot control of the aircraft; (b) disconnecting the one or more control devices from their respective actuator(s) in response to the receipt of the emergency condition signal; and (c) connecting the actuator(s) to the alternate source of control.

75 Claims, 14 Drawing Sheets

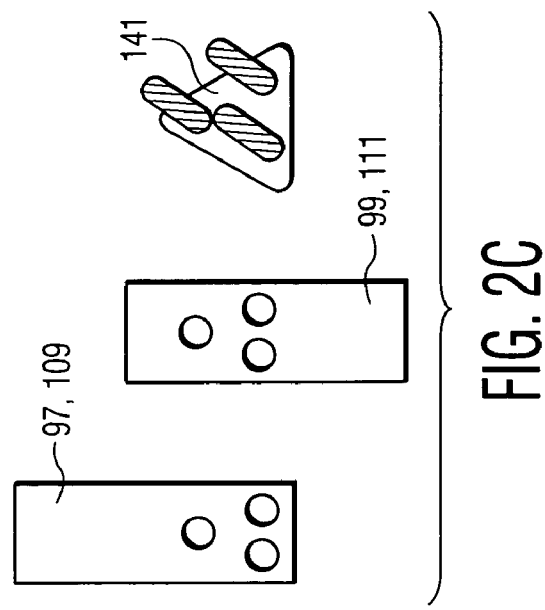
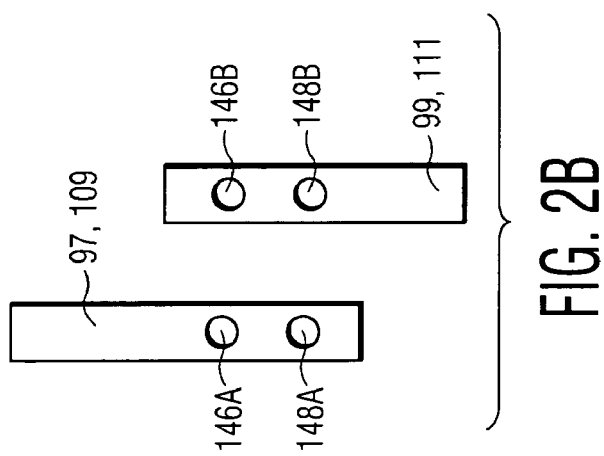
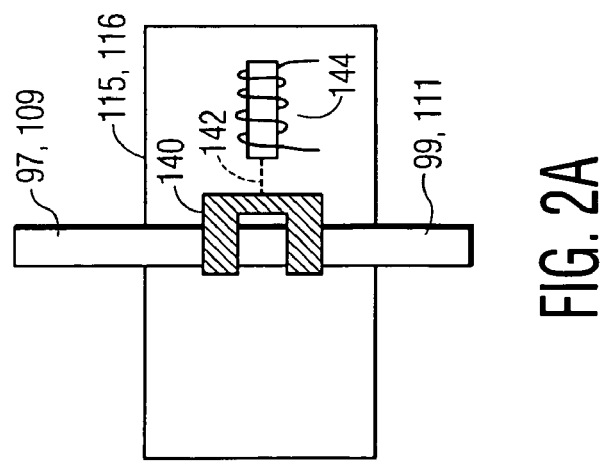

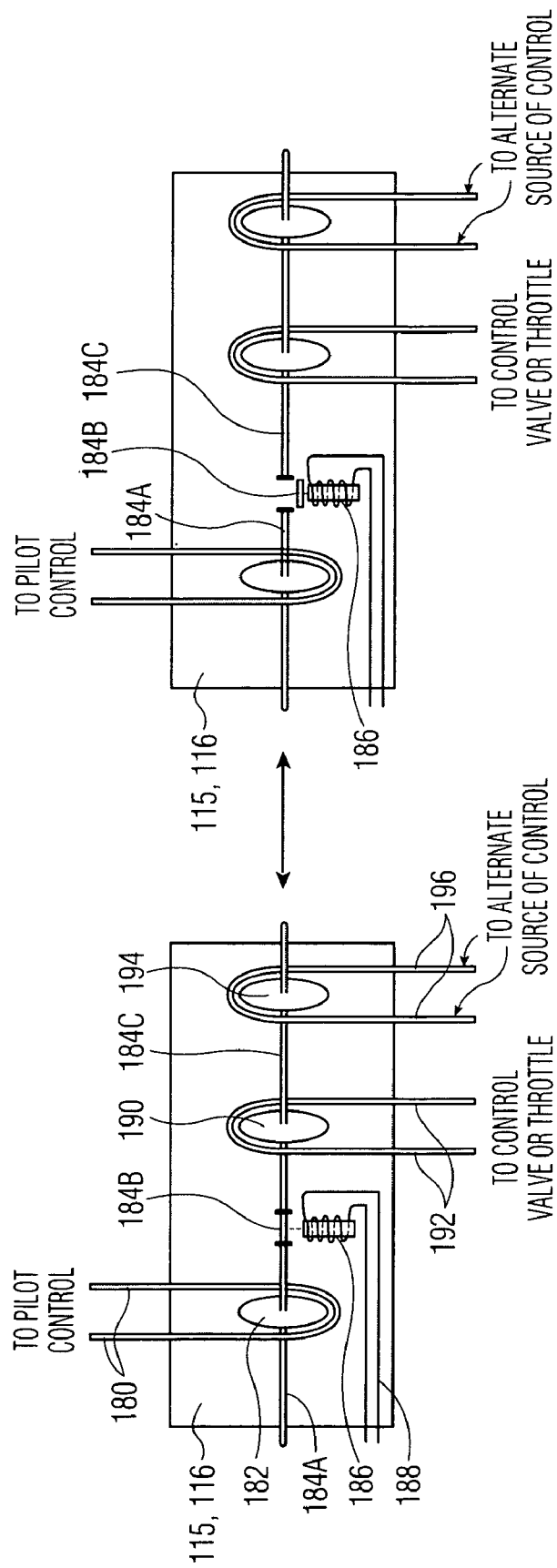

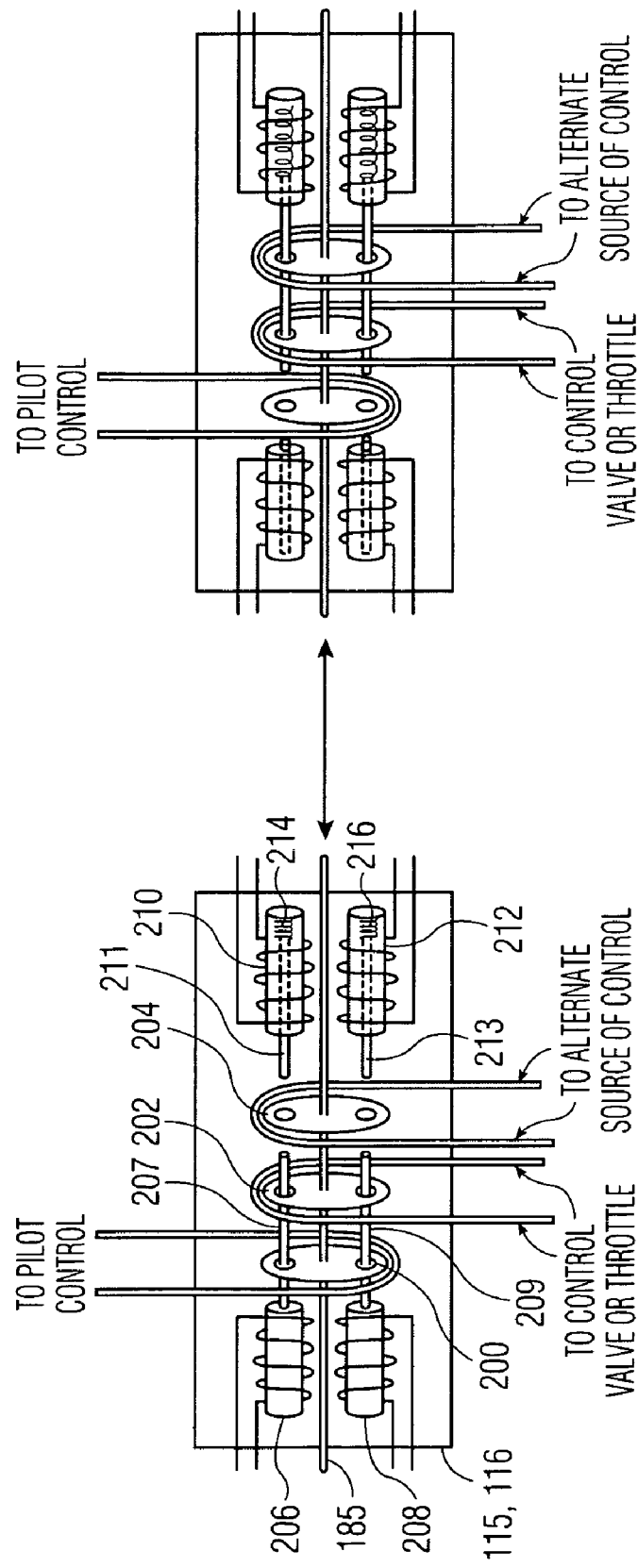

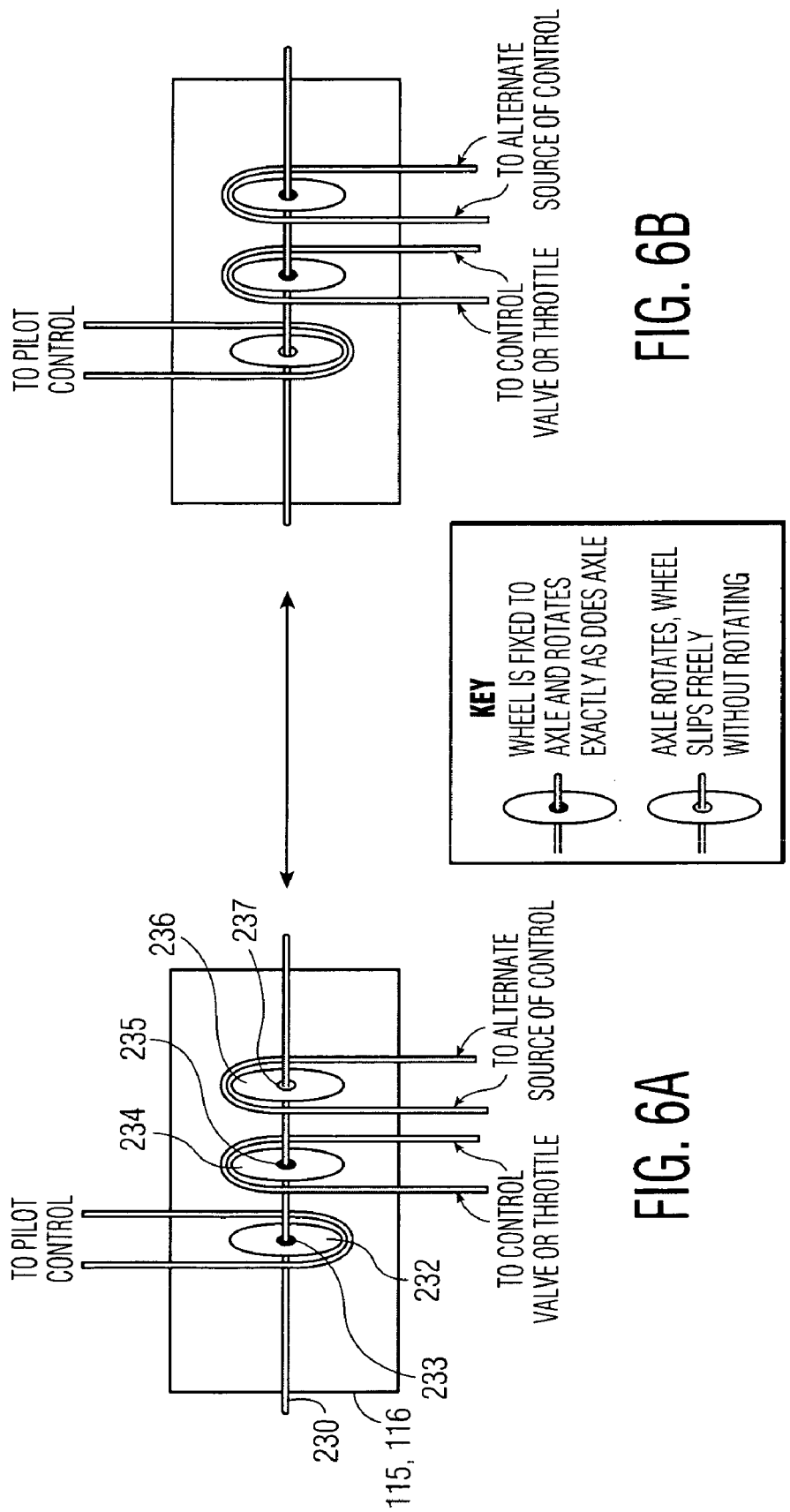

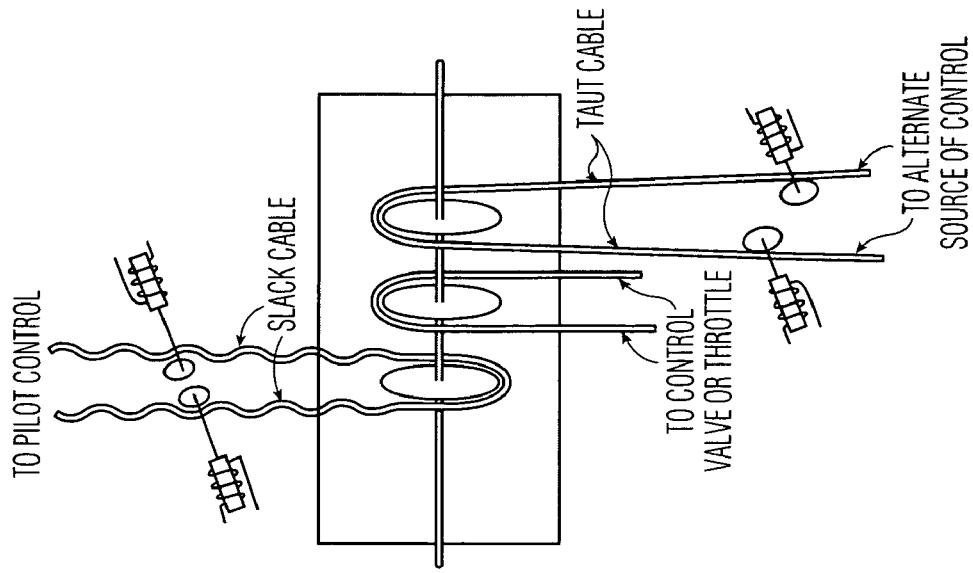
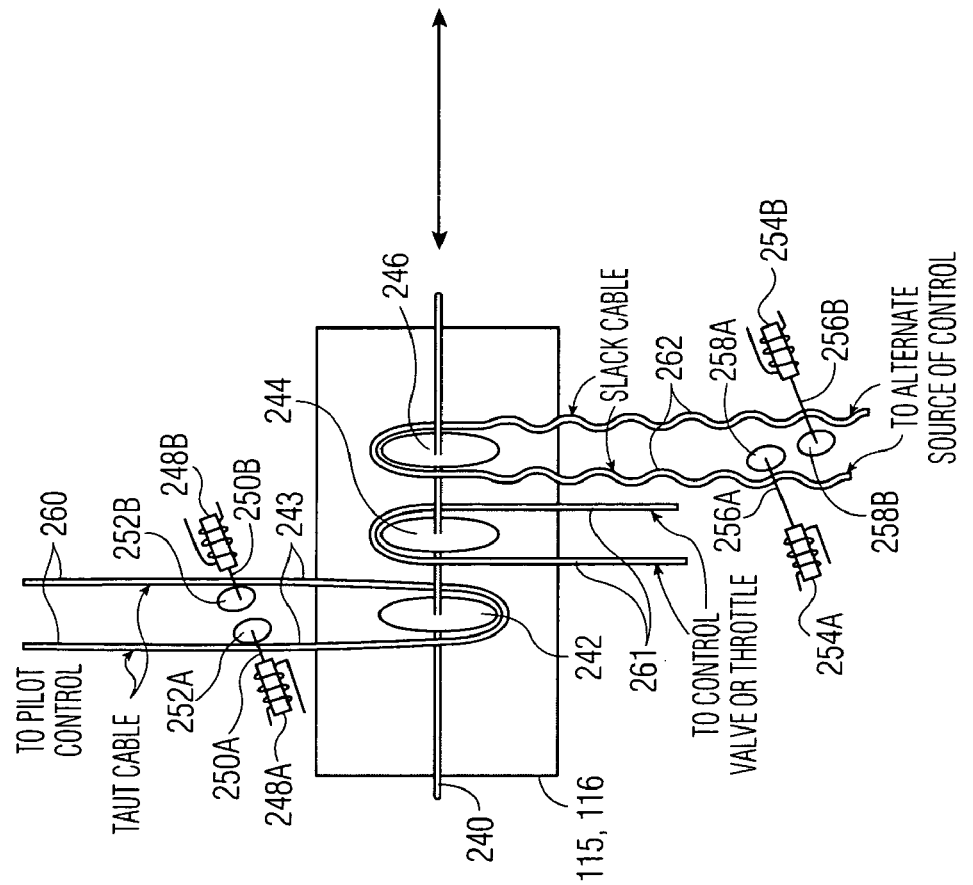
FIG. 7B
FIG. 7A

METHOD AND APPARATUS FOR DISABLING PILOT CONTROL OF A HIJACKED AIRCRAFT

CROSS REFERENCE TO RELATED PATENTS AND PATENT APPLICATIONS

The subject matter of this application is related to that disclosed in the U.S. Pat. No. 6,917,863, issued Jul. 12, 2005 and entitled "SYSTEM FOR ASSUMING AND MAINTAINING SECURE REMOTE CONTROL OF AN AIRCRAFT", which patent is incorporated herein by reference. The subject matter of this application is also related to that of the U.S. patent application Ser. No. 10/919,169, filed Aug. 16, 2004, and entitled "METHOD AND SYSTEM FOR CONTROLLING A HIJACKED AIRCRAFT". This application was published on Feb. 16, 2006 under the Publication No. US2006/0032978, which publication is also incorporated herein by reference.

This application claims priority from U.S. Provisional Application No. 60/661,563, filed Mar. 14, 2005 and U.S. Provisional Application No. 60/668,329, filed Apr. 5, 2005.

BACKGROUND OF THE INVENTION

The present invention relates to a method and apparatus for assuming and maintaining secure control of an aircraft in the event of an intended, attempted or actual attack upon, or incapacity of, the pilot(s) of the aircraft. As is well known, terrorists and hijackers sometimes attempt to assume control of an aircraft by intimidating either the passengers and/or the crew. Once the attacker (terrorist or hijacker) takes control of an aircraft, he or she may cause it to fly to an inappropriate destination or may even cause the aircraft to crash.

The U.S. Pat. No. 6,917,863 discloses a method and system for assuming and maintaining secure remote control of an aircraft in the event of an actual or potential aircraft hijacking or incapacity of the pilot(s) due to illness or injury. The U.S. Patent Publication No. U.S. 2006/0032978 discloses a number of scenarios which may arise, in the event of a hijacking or other incapacity of the pilot(s), which entail an early autopilot/flight management computer control phase, followed by a later remote pilot control phase, whereby personnel on the ground or in another aircraft can assist in bringing the aircraft down for a safe landing at a desired location.

While the aforementioned patent and published patent application disclose various methods of interrupting on-board pilot control of the aircraft, and operating the aircraft either automatically, with the aid of an autopilot and/or flight control system, or by a remote off-board (off-aircraft) human pilot, they do not disclose how the on-board operation of the aircraft may be disabled, and how control by either automated equipment or by a remote pilot may be maintained, in every type of aircraft. In the event of a hijacking, it is imperative that, once an emergency condition is declared, no one on board the aircraft (including the attackers) be allowed to influence or control the flight path of the aircraft.

Some aircraft are entirely electronically controlled—that is, so-called "fly-by-wire" aircraft—in which substantially all of the control devices operated manually by the on-board pilot(s)—e.g. the control yoke, control knobs, rudder pedals and engine controls—generate electronic control signals that are supplied to the various mechanical actuators that cause movement of the aircraft attitude control surfaces—e.g. the ailerons, flaps, elevator, rudder and trim tabs—and the aircraft engines—e.g. throttle control, mixture control and fuel source controls. With such fly-by-wire aircraft, pilot operation can be disabled by interrupting or preventing the transmission of the electronic control signals generated by the manually operated control devices on the flight deck.

The majority of aircraft, however, are not "fly-by-wire" and instead entail a mechanical connection between the manually operated pilot control devices on the flight deck and the mechanical actuators which cause movement of the aircraft attitude control surfaces, aircraft engine components and the like. These mechanical connections are made by a variety of means including rods, levers and cables which transmit mechanical motion from one device to another or by hydraulic or pneumatic tubes and/or hoses which transmit fluid pressure to the mechanical actuators.

SUMMARY OF THE INVENTION

It is therefore an object of the present invention to provide a method and apparatus for disabling on-board pilot operation of a non-fly-by-wire aircraft and transferring aircraft operation to an alternate source of control, such as an autopilot, a flight control system or an off-aircraft human pilot.

It is a further, more particular object of the present invention to provide a method and apparatus for disabling on-board pilot operation of an aircraft which has one or more manually actuated control devices, such as a control yolk, rudder pedals and/or one or more engine controls, which are mechanically coupled to mechanical actuators that cause movement of aircraft attitude control surfaces, such as ailerons, flaps, trim tabs, elevator, rudder, and/or to the aircraft engines, respectively.

These objects, as well as further objects which will become apparent from the discussion that follows, are achieved, in accordance with the present invention, by providing a method and apparatus in a non-fly-by-wire aircraft for (a) receiving a signal indicative of an emergency condition requiring the disabling of on-board pilot control of the aircraft; (b) in response to the emergency condition signal, disconnecting at least one of the control devices from at least one of the actuators; and (c) in response to the emergency condition signal, connecting the disconnected actuator(s) to the alternate source of control.

Since there are numerous different configurations of aircraft control systems, various different methods and means must be provided to implement the present invention in practice. Such methods and means form different preferred embodiments of the present invention. Such preferred embodiments are set forth in the description below and are illustrated in the accompanying drawings.

BRIEF DESCRIPTION OF THE DRAWINGS

FIGS. 2A, 2B, 2C, 2D and 2E are representational diagrams illustrating various devices for disabling a mechanical link.

FIGS. 4A and 4B are representational diagrams illustrating a device for coupling and de-coupling two coaxial, rotatable axles.

FIGS. 5A and 5B are representational diagrams illustrating a device for connecting and disconnecting pairs of rotatable pulleys.

FIGS. 6A and 6B are representational diagrams illustrating a device for coupling and de-coupling pairs of pulleys to a common axle.

FIGS. 7A and 7B are representational diagrams illustrating a tensioning device for mechanical cables.

DESCRIPTION OF THE PREFERRED EMBODIMENTS

Figure 1:
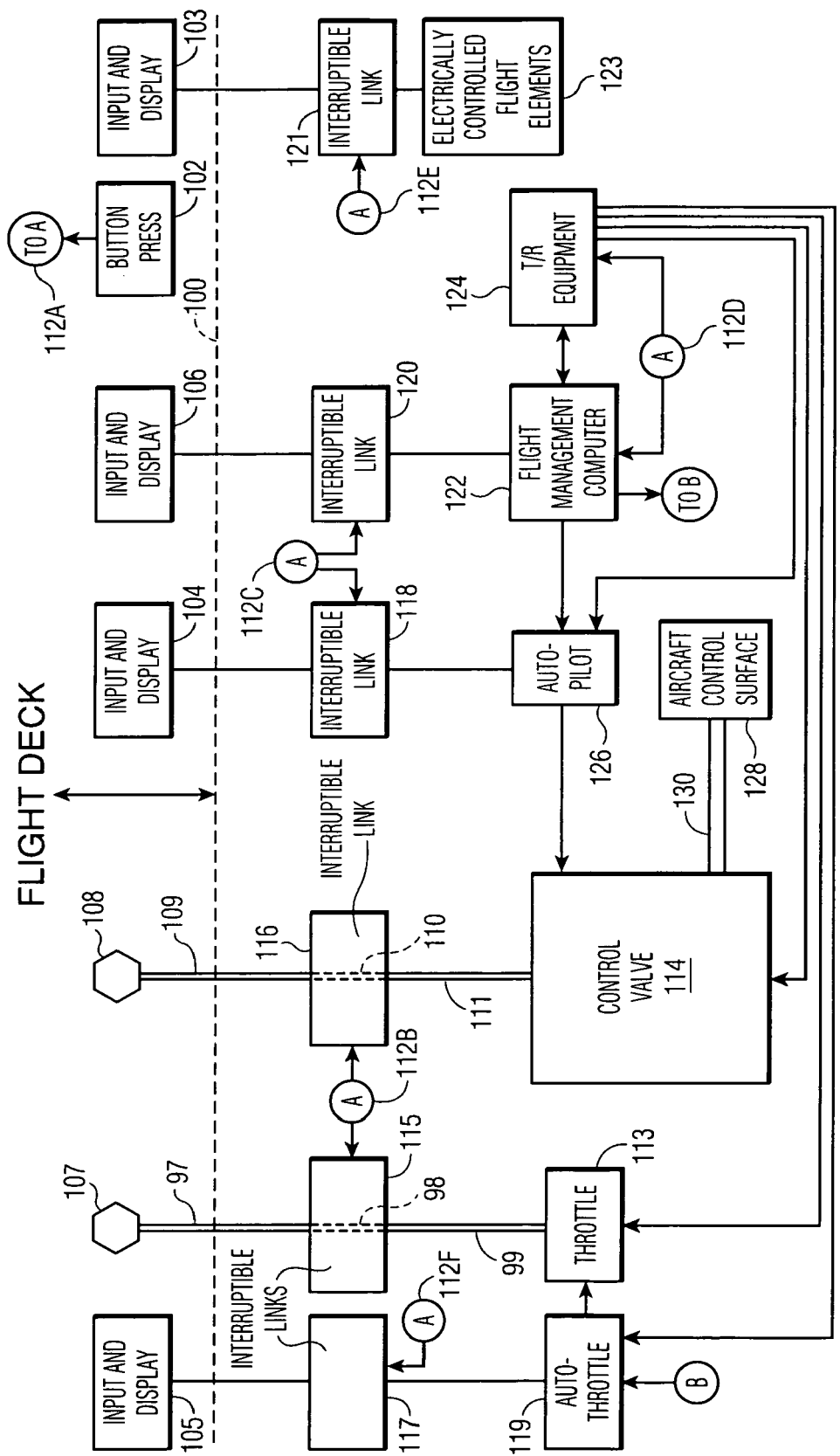
FIG. 1 is a block diagram of various elements in the control system of an aircraft indicating a number of "interruptible links" in accordance with the present invention.

The preferred embodiments of the present invention will now be described with reference to FIGS. 1-12 of the drawings. Identical elements in the various figures are designated with the same reference numerals.

FIG. 1 shows one preferred embodiment of the invention as described herein. It indicates how, in an aircraft where there are one or more mechanical linkages between the pilot's flight deck control and each of the associated control valves and throttles, control may be switched from the flight deck to either the autopilot/autothrottle/flight management computer or to a remote pilot.

In FIG. 1, the flight deck includes all elements shown above boundary line 100. Items on the flight deck include button press 102, pilot input and display 103 for electrically controlled flight elements, autopilot input and display 104, autothrottle input and display 105, flight management computer input and display 106 and pilot's movable control elements 107 and 108. Element 108 may include the control wheel (including both roll and pitch control components), the rudder pedals, or any other moving element whose motion is transmitted—either directly or indirectly—to a control surface of the aircraft. Element 107 may include one or more throttle members or other engine control devices, or any other moving elements whose motion is transmitted—either directly or indirectly—to one or more throttles or other engine-related mechanical actuators.

Element 107 is linked to mechanical linkage 97 (the portion of the linkage between 107 and 98), which is linked to 98 (the portion of the linkage controlled by interruptible link 115), which is linked to 99, which transmits mechanical force to throttle 113. Each of linkages 97, 98 and 99 may be a control rod, a cable system, a chain with multiple links, a hydraulic or pneumatic line, or combinations of these, or any mechanical system for transmission of force, as is known in the art.

Element 108 is linked to mechanical linkage 109 (the portion of the linkage between 108 and 110), which is linked to 110 (the portion of the linkage controlled by interruptible link 116), which is linked to 111, which transmits mechanical force to control valve 114. Each of linkages 109, 110 and 111 may be a control rod, a cable system, a chain with multiple links, a hydraulic or pneumatic line, or combinations of these, or any mechanical system for transmission of force, as is known in the art.

In the event of an attempted aircraft hijacking or pilot incapacity, the pilot, designated crew member or some combination thereof may activate the system via button press 102. Hereinbelow, the term "hijacking" is intended to include both of (a) pilot incapacity and other emergency situations in which the pilot(s) is (are) incapable of flying the aircraft, and (b) hijacking situations in particular. Button press may also occur off-aircraft, as described in the aforementioned patent and patent application. Button press results in the removal of aircraft control from the flight deck (and, from any person on the aircraft) by interrupting all mechanical and electrical links from the flight deck to any controllable item on the aircraft. Button press results in transmission of an electrical signal from 112A to each of:

112B which activates mechanical linkage interrupting apparatus 115 (which interrupts mechanical linkage 98), and mechanical linkage interrupting apparatus 116 (which interrupts mechanical linkage 110 [see FIG. 2, below]);

112C which activates linkage interrupting apparatus 118 and 120, interrupting on-board pilot connection to the autopilot and flight management computer;

112D which signals flight management computer 122 (e.g. to select from a preset menu of emergency destinations) and may enable T/R (transmitter/receiver) equipment 124 (thereby allowing a remote pilot to communicate with and control the hijacked aircraft. In an alternate embodiment of the invention, the receiver is always enabled [to allow for the receipt of a take-over signal from an off-aircraft location], in which case the button press signal at 112D enables the transmitter.);

112E which activates electrical-linkage interrupting apparatus 121, causing the interruption of electrical links between the flight deck and any device 123 which moves an aircraft control surface (e.g. horizontal stabilizer controls); and 112F which activates linkage interrupting apparatus 117, and thereby prevents autothrottle 119 access from the flight deck.

Embodiments of the invention which accommodate aircraft with a plurality of autopilots, of autothrottles and of flight management computers are possible. Hereinabove and hereinbelow, all references to "autopilot," to "autothrottle" and to "flight management computer" are intended to include embodiments of the invention with one or more autopilot, one or more autothrottle and one or more flight management computer. In the case of a plurality of flight management computers, each flight management computer may be linked to one or more other flight management computers, and flight management computer is linked to one or more autothrottles and autopilots.

Button press will result in the setting of any priority circuits—i.e. circuits which allow the pilot to override the autopilot—to autopilot or remote pilot control.

Button press may also:

(a) result in the nullification/ cancellation of any restriction on autopilot control which may have been imposed when there is no force applied to the control wheel;

(b) remove—either completely or partially—one or more autopilot-imposed constraints on either the position or on the rate of change of a position of an aircraft control surface; and (c) deactivate so-called artificial-feel systems.

Elements 117, 118, 120 and 121 each consist of one or more electrical switches or switching circuits. Elements 117, 118 and 120 may alternatively be mechanical linkages as described hereinbelow. In the event of hijacking, it is desirable to interrupt the display of any flight management information on the flight deck and it is necessary to prevent any input from the flight deck to autothrottle 119, autopilot 126 and flight management computer 122.

During normal—i.e. non-hijacking/emergency conditions, mechanical forces from the pilot's movement:

(a) of 108 are transmitted via 109/110/111 to control valve 114. This hydraulic valve, as is known in the art, couples the pilot's mechanical action to the movement of a control surface (e.g. ailerons, elevator, rudder) on the aircraft. Electrical autopilot input to the control valve is via a transfer valve, as is known in the art (transfer valve not separately shown in this FIG.). The control valve causes force to be applied to the aircraft control surface via an actuator (known in the art, not shown) whose force is applied to the control surface 128 via mechanical linkage 130. Linkage 130 may be a control rod, a cable system, a chain with multiple links, or combinations of these, or of any other force transmitting system, as is known in the art; and (b) of 107 are transmitted via 97/98/99 to throttles 113. These throttles may also be controlled by autothrottle 119, which may be controlled by (i) the pilot, from input 105 (via interruptible link 117); or (ii) the flight management computer 122.

The set of elements 108, 109, 110, 111, 114, 116, 128 and 130 are duplicated for each of the plurality of control valves that control movable aircraft surfaces.

The set of elements 97, 98, 99, 107, 113 and 115 may be duplicated for each of the throttles.

During a hijacking, following the interruption of links to the flight deck, the hijacked aircraft is controlled by either:

(a) control signals which originate off-aircraft, i.e. control signals from the remote pilot, and/or (b) control signals which originate on-board the hijacked aircraft from one or more of the flight management computer(s), the autopilot(s) and the autothrottle(s).

The aforementioned (a) and (b) are, hereinbelow, referred to as the alternate source of control. Hereinbelow, any or all of the following will be referred to as a controlled component:

(i) a controlled surface on the aircraft, (ii) a controlled surface actuator, (iii) a control valve corresponding to a controlled surface, (iv) a throttle, and (v) an engine-related mechanical actuator.

The means by which the alternate source of control signals manipulate the controlled component include:

(a) remote pilot signals, transmitted from an off-aircraft location are received by 124 and (after decryption and decoding, as discussed in U.S. Pat. No. 6,917,863) then sent directly to the controlled component. Electrical-to-mechanical conversion of the signals is via transfer valve or other means as is known in the art;

(b) remote pilot signals, transmitted from an off-aircraft location are received by 124 and then sent to (1) autopilot 126, then to control valve 114, which controls 128, and (2) autothrottle 119, which controls 113;

(c) remote pilot signals, transmitted from an off-aircraft location are received by 124 and then transmitted to flight management computer(s) 122, and then sent to (1) autopilot 126, then to control valve 114, which controls 128, and (2) autothrottle 119, which controls 113;

(d) signals originating in flight management computer 122 (triggered by button press, and without the necessity of remote pilot) are sent to (1) autopilot 126, then to control valve 114, which controls 128, and (2) autothrottle 119, which controls 113;

(e) the autopilot(s) controls the aircraft control surfaces and the autothrottles control the throttles; and (f) signals originating in flight management computer 122 (triggered by button press, and without the necessity of remote pilot) are sent directly to the controlled component.

Aforementioned hijacking management methods (a)-(e) are illustrated in FIG. 1; Method (f) is not shown. Embodiments of the invention are possible based on each of the aforementioned methods. Embodiments of the invention are possible which use different methods for different controlled components. Embodiments of the invention are possible which use different methods for a single controlled component.

Some or all of the flight deck elements shown may be duplicated for control by a first officer. In the event of button press, each corresponding first officer mechanical and electrical link would be interrupted, and each additional button press-related action described hereinabove would apply to first officer-related control links.

In one or more alternate embodiments of the invention, mechanical linkage 109/110/111 could be replaced by an electrical linkage to the flight management computers or to pilot inputs on the flight deck, which would input control valve 114 via a transfer valve. In one or more alternate embodiments of the invention, mechanical linkage 97/98/99 could be replaced by an electrical linkage to the flight management computers or to throttle controls. In the case of either of the aforementioned replacements, the corresponding interruptible mechanical link 116 and 115 would be replaced by an interruptible electrical link, similar to element 121.

FIG. 2A shows an expanded front view of one embodiment of the mechanical interruptible link shown as elements 115 and 116 in FIG. 1; FIG. 2B shows a side view of the upper (elements 97 and 109 in FIG. 1) and lower (elements 99 and 111 in FIG. 1) portions of the control rod. Under normal (i.e. non-hijacked) conditions, the upper and lower portions are held together by U-shaped link 140. The upper portion of 140 inserts into holes 146A and 146B; the lower portion of 140 inserts into holes 148A and 148B. In the event of a hijacking, button press sends a signal to 112B (FIG. 1) which activates solenoid 144, which, via connecting link 142 pulls U-shaped link 140 out holes 146A, 146B, 148A and 148B, thereby separating the upper portion (accessible to the pilot) from the lower one (extending to the control valve or throttles). This action results in disabling of pilot control of mechanical aircraft components 113 and 128 linked to the pilot by a control rod.

Embodiments of the invention with different shapes and relative sizes of the control rod and the U-shaped link are possible. The entire interruptible link shown may be located anywhere between the point nearest the pilot and the point furthest from the pilot; Location at points not accessible from the flight deck are advantageous.

Link 140 need not be U-shaped. FIG. 2C shows a three-pronged version, 141. As was the case with the U-shaped version, each protruding section passes through one of the holes in the upper control arm, and the corresponding hole in the lower control arm.

Figure 2D:
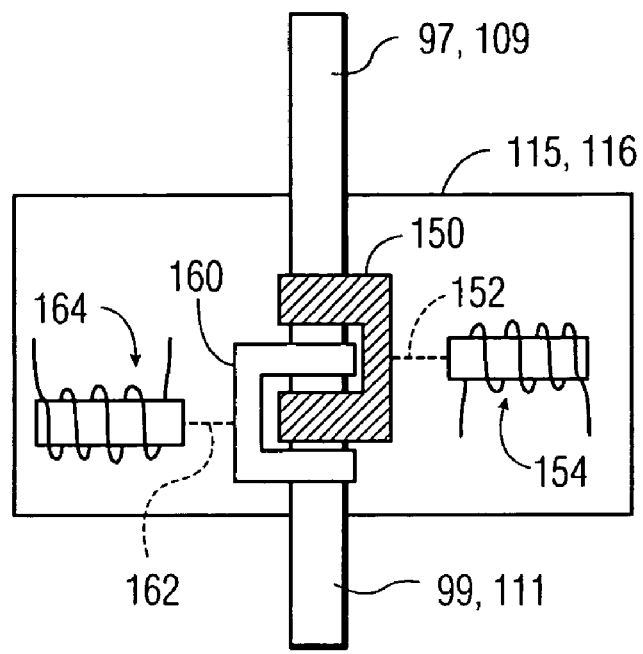
Figure 2E:
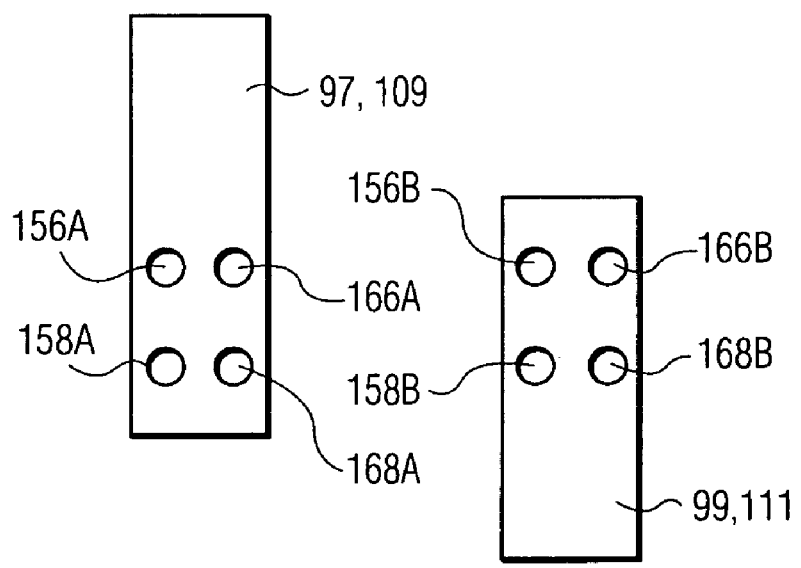

FIGS. 2D and 2E show front and side views of an embodiment that uses two U-shaped links to hold the upper and lower control arms together. The presence of a second link increases safety (less chance of accidental link removal resulting in a loss of control) and control rod stability during operation. In FIG. 2D, link 150 is in front of link 160. The upper portion of 150 passes through holes 156A and 156B; The lower portion of 150 passes through holes 158A and 158B. The position of 150 is controlled by solenoid 154, linked to 150 by link 152; Link 150 is removed from its associated control rod in a manner similar to that for link 140, as discussed hereinabove. The upper portion of link 160 passes through holes 166A and 166B; The lower portion of 160 passes through holes 168A and 168B. The position of 160 is controlled by solenoid 164, linked to 160 by link 162; Link 160 is removed from its associated control rod in a manner similar to that for link 140, as discussed hereinabove.

All of the generalizations discussed with regard to link 140 are applicable to the dual link geometry discussed in conjunction with FIGS. 2D and 2E. Furthermore, a wide range of other geometric arrangements of links are possible including:

(a) arrangements in which the two links are horizontally oriented (e.g. link 150 passes through holes 156A, 156B, 166A and 166B);

(b) arrangements in which there are three or more links;

(c) arrangements in which one or more links have three or more protruding elements with geometry other than that shown in FIG. 2C;

(d) arrangements in which the links have a single protruding element; and (e) arrangements with explosive bolts, as are known in the art.

Other geometric and mechanical arrangements will be apparent to those skilled in the art.

Figure 3C:
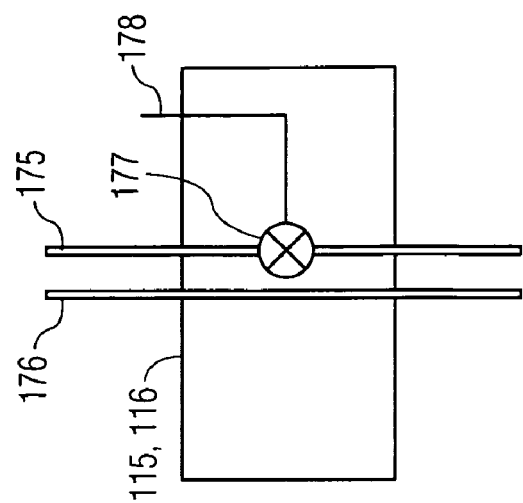
FIG. 3C is a representational diagram illustrating a device for blocking fluid passage in a hydraulic or pneumatic line.
Figure 3B:
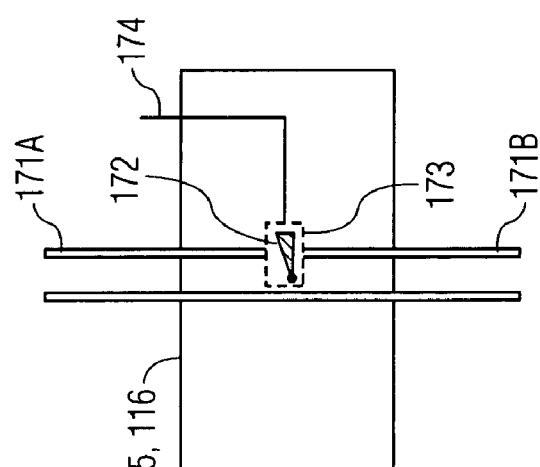
FIGS. 3A and 3B are representational diagrams illustrating a device for severing a mechanical cable.
Figure 3A:
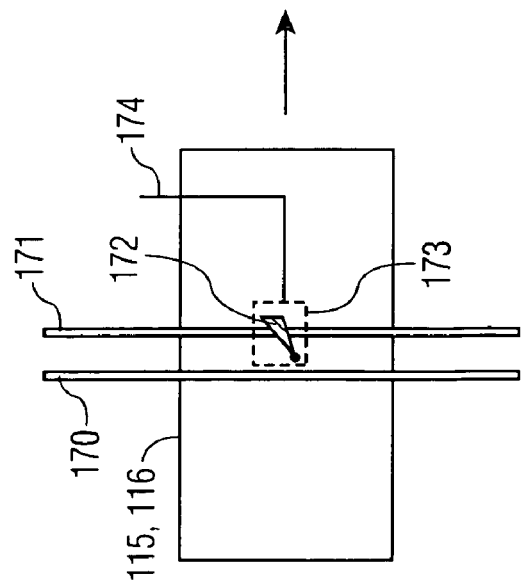

FIGS. 3A and 3B show the use of a moveable blade 172 to sever cable 171, thereby disabling pilot control in a system which uses cables to link the pilot to the mechanically controlled component. During normal operation (FIG. 3A), cable pair 170 and 171 mechanically links the pilot to a controlled component (control valve, throttle, or [in the case of a small aircraft] the actual controlled aircraft surface). In the event of a hijacking, a signal (described hereinabove) via 112B (FIG. 1) and thence via wires 174 to blade controlling mechanism 173 causes the blade to move so as to sever cable 171. The result, shown in FIG. 3B is that cable 171 is divided into segments 171A and 171B. The cable pair 170 and 171A is no longer able to act in concert to transmit force from the pilot to the mechanically controlled component.

Other embodiments of this invention include:

(a) two blades, one for each of 170 and 171;

(b) cutting the cable with means other than a blade including:

(i) mechanically abrasive means—mounted, for example, on a motorized drill bit which is oriented perpendicular to the cable axis; and (ii) chemically abrasive means—e.g. a strong acid which dissolves the cable.

FIG. 3C illustrates the interruption of a pneumatic or hydraulic line 175 which transmits force from a control 107, 108 on the flight deck. The opening of valve 177 interrupts the transmission of a control force by line 175. Valve 177 may be controlled at 178 by an electromagnetic, hydraulic, or pneumatic actuator, or may be any other remotely operated valve configuration as is known in the art. Return line 176 is shown. The operation of a controlled component on the flight deck causes an increase in pressure in 175, which, causes motion of a pneumatically or hydraulically controlled actuator, as is known in the art. The opening of valve 177 disables control of a controlled component from the flight deck.

FIGS. 4A and 4B (normal and hijacking conditions, respectively) show a means of uncoupling pilot mechanical control by removing a link between two wheels. During normal operation, pilot mechanical motion is transmitted via cable 180 causing wheel 182 to rotate about axle 184A, 184B, 184C. The rotation of axle segment 184C causes rotation of wheel 190, which causes axial motion of cable 192, which transmits the pilot mechanical motion to the mechanically controlled object.

In the event of hijacking, button press signal 112B causes an electrical signal to solenoid 186 through wires 188. This results in the removal of axle link 184B (FIG. 4B shows the link in the 'removed' position.), so that segments 184A and 184C are no longer mechanically linked. The result is that pilot mechanical actions are not transmitted to wheel 190, cable 192 and the control valve or throttle that cable 192 acts upon.

The alternate source of control transmits rotational input to the controlled component as follows: Axial force from cable 196 (see below in conjunction with FIG. 12) causes the rotation of wheel 194, which causes the rotation of axle segment 184C, causing the rotation of wheel 190 and axial motion of cable 192. Embodiments of the invention are possible in which under normal (non-hijack) conditions wheels 190 and 194 are not mechanically linked; After button press, an additional insertable link is inserted which does link them. In embodiments in which the mechanical link between wheels 190 and 194 is at all times present, the rotational friction imposed by the attachment of the 194/196 components would be either minimized or compensated for.

FIGS. 5A and 5B (normal and hijacking conditions, respectively) show a means of uncoupling pilot mechanical control by removing mechanical links between two adjacent wheels using solenoid apparatus. Under normal (i.e. non-hijacking) conditions, pilot mechanical actions cause the rotation of wheel 200, which is transmitted to wheel 202 via rods 207 and 209. These rods are attached to the cores of solenoids 206 and 208 respectively. Each of wheels 200, 202 and 204 rotates freely about axle 185, so that under normal conditions the rotational motions of wheels 200 and 202 is not transmitted to wheel 204.

During a hijacking:

(a) signal 112B causes a current to flow in solenoids 206 and 208, which causes each of rods 207 and 209 to be displaced toward the solenoid core (i.e. leftwards in the figure). Once each of the rods no longer extends into wheel 202, pilot actions which cause the rotation of wheel 200 are no longer transmitted to wheel 202, or to the mechanical item to which wheel 202 and its associated cable are linked.

(b) Alternate source of control motions are transmitted to the controlled component as follows: Rods 211 and 213 are extended (leftwards in the figure) so that wheel 202 and wheel 204 are mechanically linked. Such extension may be brought about by:

(i) Running a current through the solenoid during normal conditions, which exerts a strong enough holding force on rods 211 and 213 to overcome the leftwards force of springs 214 and 216. At the time of button press, the current is removed, and the springs, without the resisting force of the activated solenoid, can extend, forcing rods 211 and 213 leftwards (as shown in FIG. 5B), thereby mechanically linking the remote pilot actions transmitted to wheel 204, to the controlled component through wheel 202;

(ii) solenoid construction, in the case of 214 and 216, so that the application of electric current causes a repulsive force on the core, causing it to protrude (leftwards in the FIG.). In this situation, springs 214 and 216 would not be necessary.

Other variations of the approach shown in FIGS. 5A and 5B include:

(a) having wheels 202 and 204 mechanically linked at all times (see parallel discussion in the context of FIG. 4);

(b) using a single pair of solenoids, 210 and 212 for all control, by:

(i) eliminating solenoids 206 and 208, and their associated rods 207 and 209;

(ii) eliminating springs 214 and 216;

(iii) lengthening rods 211 and 213 so that they extend far enough (to the left, in the FIG.) to reach through each of wheels 200, 202 and 204.

Under normal conditions, no current flows through the solenoids, and all three wheels are linked. Under hijack conditions, activation of solenoids 210 and 212 pulls the rods (rightwards in the figure) so that they no longer reach wheel 200. This de-couples pilot actions; and (c) having the number of solenoids be other than four.

FIGS. 6A and 6B (normal and hijacking conditions, respectively) show a means of uncoupling pilot mechanical control, by control of whether or not the rotation of wheel 232 and of wheel 236 is linked to axle rotation. The key is wheel hubs 233 and 237, which are such that they may be maintained in one of two states, either tightly fitting to axle 230, or loosely fitting. In the former case, the tightly fitting wheel and the axle turn in concert; In the latter case, rotational motion of the (loosely fitting) wheel and that of the axle are de-coupled.

Under normal conditions, wheel 232 transmits pilot actions via its hub 233 to axle 230. The hub maintains a tight hold on the axle, so that each degree of rotation of wheel 232 is mirrored by one degree of rotation of axle 230. Similarly wheel 234, with hub 235 which tightly attaches it to axle 230, rotates exactly as does 230. During normal conditions, hub 237 is maintained in a loosely fitting state, and rotation of axle 230 does not cause rotation of wheel 236.

During a hijacking, the states of hubs 233 and 237 are reversed, i.e. 233, becomes loosely fitting, and 237 becomes tightly fitting. The result is that on-board pilot actions which cause wheel 232 to rotate do not cause the rotation of axle 230; and alternate source of control actions which cause wheel 236 to rotate (see discussion of FIG. 12, below) do cause the rotation of axle 230 and of wheel 234, which couples the alternate source of control to the mechanically controlled component.

The state of hubs 233 and 237 is determined by an electrical input to either the hub itself, or to axle 230 which reflects whether button press has occurred. The hub and axle details which allow these two states is not shown, but is known in the art. Possible mechanical arrangements included electrically controlled pins which extend out of the axle into the hub, electrically controlled pins which extend out of the hub into the axle, movable gears which allow the axle and hub to engage, and other arrangements as are known in the art.

FIGS. 7A and 7B (normal and hijacking conditions, respectively) show a means of uncoupling pilot mechanical control by creating slack in the cable loop which is to be mechanically de-coupled. The length of cables 260 and 262 are greater than is needed to encompass their associated "circuits." This extra length causes slack (as shown for cable 262 in FIG. 7A) so that rotation of its associated wheel (246 in the case of cable 262) is not caused by axial motion of the cable. The cable is made taut, when appropriate, by the movement of two wheels in the plane defined by the path of the cable, in an outward direction, so as to take up the slack. The position of these wheels is controlled by solenoids.

Under normal conditions, on-board pilot control (of a control valve or throttle, for example) is maintained by keeping cable 260 taut. This is accomplished by applying a current to solenoids 248A and 248B, which cause respective motion to the left (in the figure) and right (in the figure) of wheels 252A and 252B, through respective attaching rods 250A and 250B. (These aforementioned wheels would actually be located in the plane of the cable loop; a current passing through the solenoids would cause each of wheels 252A and 252B to move in a direction away from the inside of the loop defined by cable 260.) When 260 is taut, pilot actions cause wheel 242 to turn; 242 is fixed to and causes identical turning of axle 240, and causes identical turning of wheel 244, which transmits the pilot-initiated force through cable 261 to a control valve or throttle. Although wheel 246 also turns, no force is transmitted to cable 262 because it is slack. Its associated solenoids are electrically inactive, and the positions of associated wheels 258A and 258B maintain the slack state of 262.

Following button press, the state of each of the four solenoids reverses. The two previously active ones, 248A and 248B become inactive as current to them is shut off, and slack immediately develops in cable 260, thereby de-coupling pilot control, as shown in FIG. 7B. Simultaneously, solenoids 254A and 254B receive a current, their associated control rods 256A and 256B move associated wheels 258A and 258B in a direction away from the inside of the loop defined by cable 262, allowing 262 to become taut. The result is that alternate source of control actions are transmitted to cable 261 in the same way the on-board pilot actions had been transmitted during the normal state.

Embodiments of the invention with different numbers of solenoids are possible. Embodiments in which spring-based arrangements are used to take up some of the slack, and prevent the "derailing" of a cable are possible, as is known in the art.

Figure 8A:
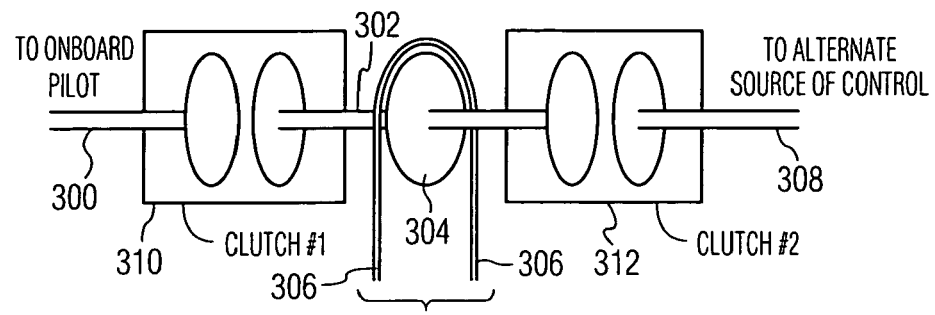
FIGS. 8A and 8B are representational diagrams illustrating clutch devices for coupling and de-coupling rotatable mechanical members.

FIG. 8A shows an embodiment of the invention which allows for the assignment of the source of control of a controlled component to either (a) the onboard pilot or (b) the alternate source of control. In this embodiment, a rotating wheel 304 attached to the controlled component via cable 306 can be linked to either of two other rotating (or potentially rotating [Hereinabove and hereinbelow, the term "rotating" is intended to include "actually rotating" or "potentially rotating".]) sources: (a) element 300, reflecting onboard pilot control, or (b) element 308 reflecting control from the alternate source of control. The transmission of onboard pilot rotational motion to the controlled component occurs when clutch 310 is engaged, such that its constituent parallel rotating elements transmit motion from one to the other. The transmission of alternate source of control rotational motion to the controlled component occurs when clutch 312 is engaged, such that its constituent parallel rotating elements transmit motion from one to the other. During onboard pilot controlled flight, clutch 310 is engaged; Clutch 312 may or may not be engaged. During a hijacking, clutch 312 is engaged and clutch 310 is irreversibly disengaged. The clutches are controlled electrically by methods that are known in the art. Irreversible disengagement of clutch 310 may be effected by electronic, mechanical or hydraulic means.

Element 310 constitutes one form of interruptible link 115 and 116.

Figure 8B:
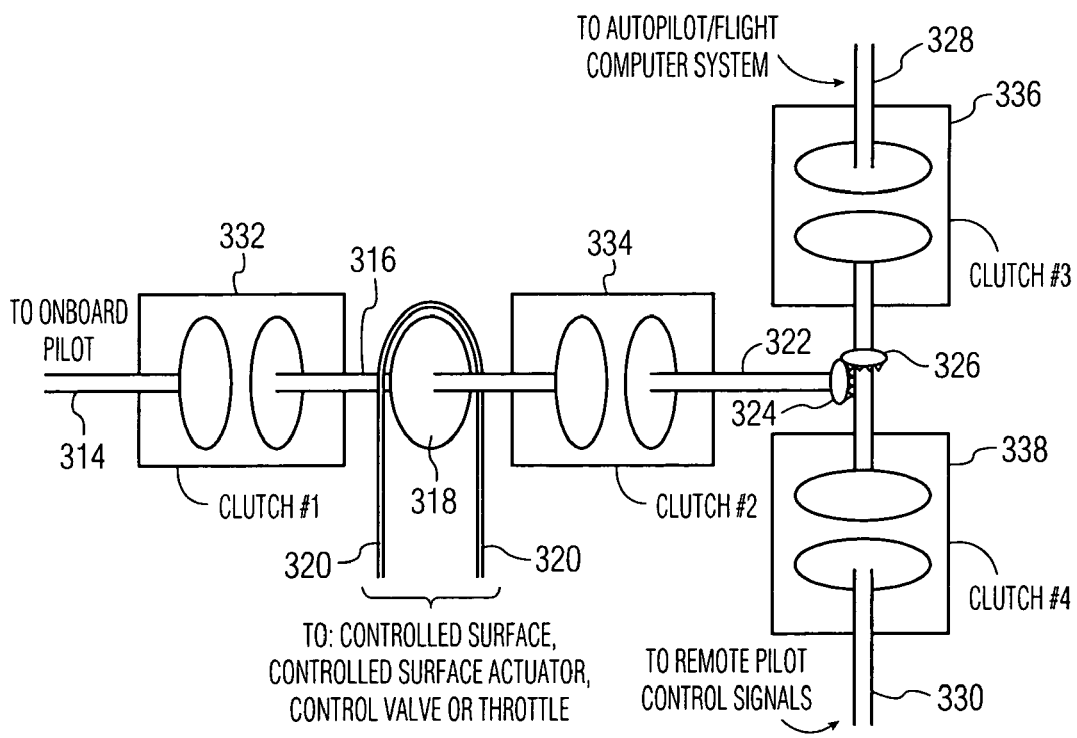

FIG. 8B shows an arrangement where four clutches allow for the selection among three sources of control i.e. on-board pilot, remote pilot and autopilot/flight computer system. When the onboard pilot is in control, clutch 332 is engaged, and onboard pilot rotational motion is transmitted from 314 through 332 to axle 316, to wheel 318, to cable 320 to the controlled component. During a hijacking, clutch 332 is irreversibly disengaged (using methodology described hereinabove) and clutch 334 is engaged. During autopilot/flight computer control, autopilot/flight computer rotational motion is transmitted via 328 through clutch 336 (which is engaged during autopilot/flight computer control) to gear 326, to gear 324, to rod 322, to engaged clutch 334, to wheel 318, to cable 320, to the controlled component. During remote pilot control, remote pilot rotational motion is transmitted via 330 through clutch 338 (which is engaged during remote pilot control) to gear 326, to gear 324, to rod 322, to engaged clutch 334, to wheel 318, to cable 320, to the controlled component.

Element 332 constitutes one form of interruptible link 115 and 116.

Figure 9A:
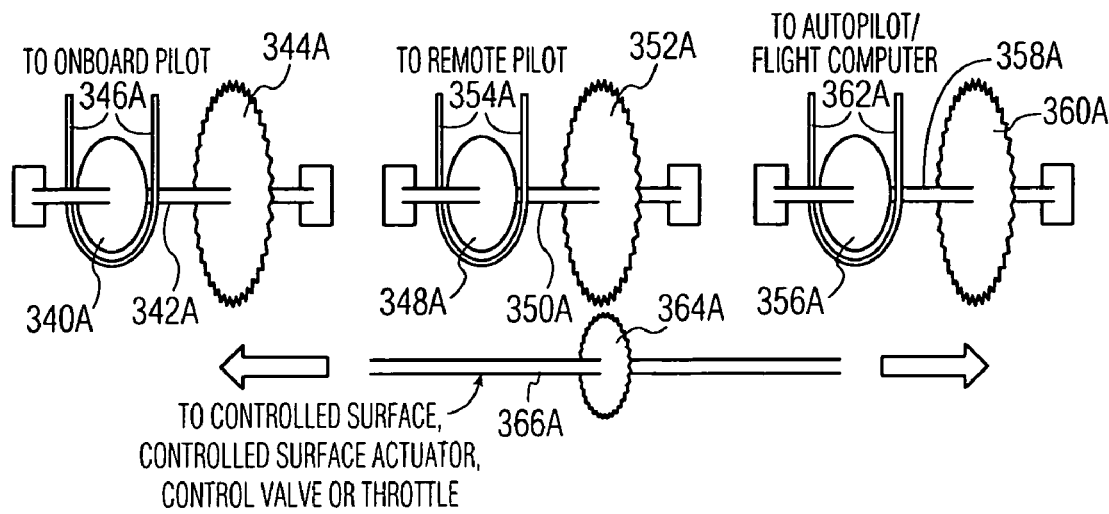
FIGS. 9A and 9B are representational diagrams illustrating a transmission device for coupling and de-coupling rotatable mechanical members.

FIG. 9A shows an embodiment of the invention in which one of three sources of control, of the controlled element is selected by an arrangement of gears. The three sources of control are (a) onboard pilot, (b) remote pilot and (c) autopilot/flight computer. The example shown in the FIG. is of remote pilot control, in which remote pilot actions are transmitted through cable 354A to wheel 348A, to axle 350A, to gear 352A, to gear 364A, to axle 366A to the controlled component. During onboard pilot control, gear 366A is moved so that it meshes only with gear 344A. Onboard pilot motion is then transmitted to the controlled component via the sequence of elements 346A, 340A, 342A, 344A, 364A and 366A. During autopilot/flight computer control, gear 366A is moved so that it meshes only with gear 360A. Autopilot/flight computer motion is then transmitted to the controlled component via the sequence of elements 362A, 356A, 358A, 360A, 364A and 366A ["Sequence", hereinabove and hereinbelow is intended to indicate a spatial sequence, not a temporal one.].

Gear 364A may be moved so that it meshes with one of gears 344A, 352A and 360A by a mechanism which is either electromagnetic, hydraulic or hybrid, as is known in the art. During a hijacking, gear 364A is prevented from meshing with gear 344A (thereby de-coupling onboard pilot control) by a mechanism which may be either electronic, electromagnetic, hydraulic or hybrid.

FIG. 9A illustrates one form of interruptible link 115 and 116.

Figure 9B:
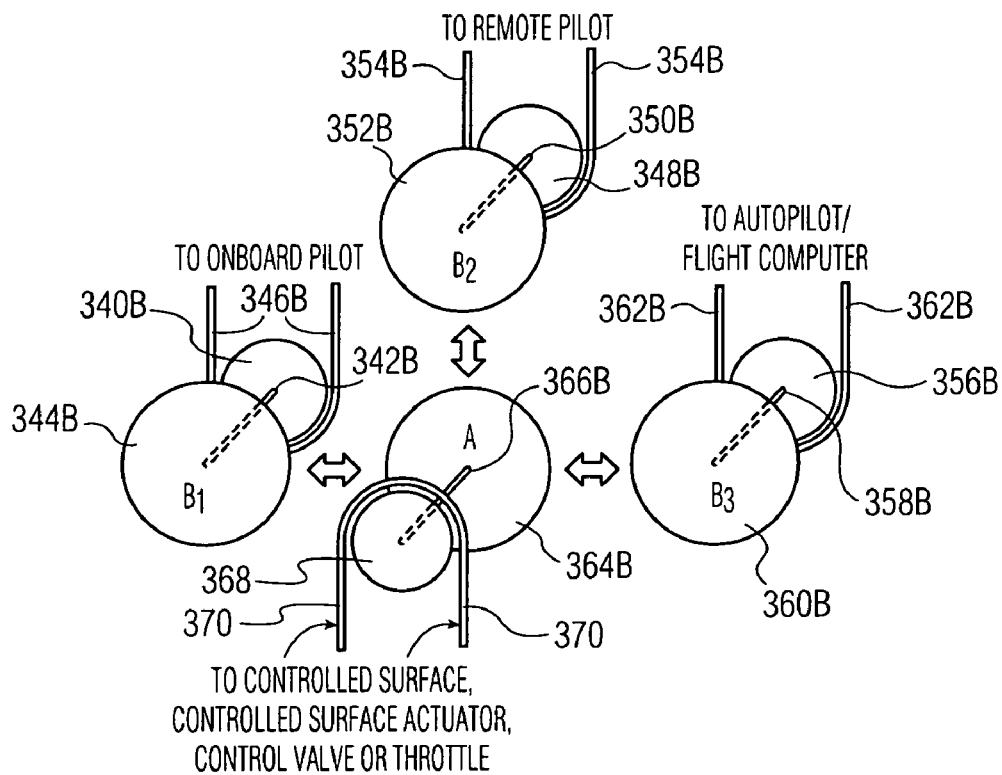

FIG. 9B shows an embodiment of the invention in which one of three sources of control [(a) onboard pilot, (b) remote pilot and (c) autopilot/flight computer], of the controlled element is selected by a clutch mechanism. The clutch mechanism links the rotational motion of one of wheels B1, B2 or B3 (elements 344B, 352B, 360B) to wheel A (element 364B), thereby linking axial motion of one of cables 346B (onboard pilot control), 354B (remote pilot control) or 362B (autopilot/flight computer control) to axial motion of cable 370 (controlled component motion). In the case of onboard pilot control, axial movement of 346B is transmitted via the sequence 346B, 340B, axle 342B, 344B, 364B, axle 366B, 368, 370. In the case of remote pilot control, axial movement of 354B is transmitted via the sequence 354B, 348B, axle 350B, 352B, 364B, axle 366B, 368, 370. In the case of autopilot/flight computer control, axial movement of 362B is transmitted via the sequence 362B, 356B, axle 358B, 360B, 364B, axle 366B, 368, 370.

Two different formats for linking the rotation of wheel A to the rotation of one of wheels B1, B2, B3 together include: (I) wheel A may move to touch one of the B wheels; or (II) one of the B wheels may move to touch wheel A. Another approach would be one in which both of wheel A and the selected B wheel move towards each other. Yet another approach would be one in which the position of the center of both wheel A and the B wheels is stationary, and in which there is interposition of movable intermediate elements (either solid or fluid) between wheel A and the B wheels, thereby linking the rotational motion of wheel A and the selected B wheel.

The movement of wheel A, the B wheels, and/or any mechanism which may be interposed between wheel A and the selected B wheel is by a mechanism which is either electromagnetic, hydraulic or hybrid, as is known in the art. During a hijacking, wheel 344B is prevented from contacting—either directly or indirectly—wheel 364B (thereby de-coupling onboard pilot control) by a mechanism which may be either electronic, electromagnetic, hydraulic or hybrid.

FIG. 9B illustrates one form of interruptible link 115 and 116.

Figure 10A:
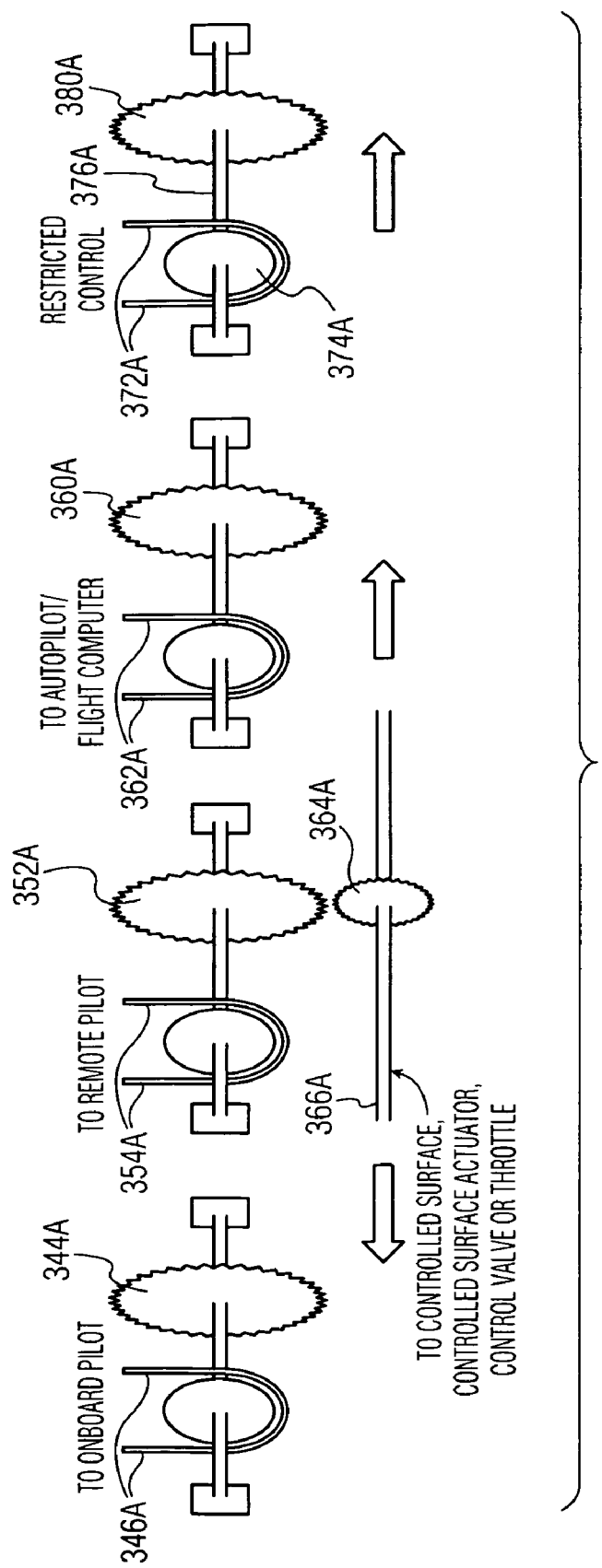
FIGS. 10A and 10B are representational diagrams showing additional embodiments of a transmission device and a clutch device for coupling and de-coupling rotatable mechanical members.

FIG. 10A shows an embodiment of the invention in which one of four sources of control, of the controlled element is selected by an arrangement of gears. The four sources of control are (a) onboard pilot, (b) remote pilot, (c) autopilot/flight computer and (d) restricted control. Restricted control refers to a post-landing state in which remote pilot control is in effect, but in which certain restrictions on the motion of aircraft control surfaces and throttle control are imposed to prevent a second take-off. (These are referred to in U.S. patent application Ser. No. 10/328,589, wherein they are referred to as MAC State 4.) The example shown in FIG. 10A is remote pilot control, in which remote pilot actions are transmitted through cable 354A, to gear 352A, to gear 364A, to axle 366A to the controlled component. During on-board pilot control, gear 364A is moved so that it meshes only with gear 344A. On-board pilot motion is then transmitted to the controlled component via elements 346A, 344A, 364A and 366A. During autopilot/flight computer control, gear 364A is moved so that it meshes only with gear 360A. Autopilot/flight computer motion is then transmitted to the controlled component via the sequence of elements 362A, 360A, 364A and 366A. During restricted control, gear 364A is moved so that it meshes only with gear 380A. The restricted control format is then transmitted to the controlled component via the sequence of elements 372A, 374A, 376A, 380A, 364A and 366A.

Gear 364A may be moved so that it meshes with one of gears 344A, 352A, 360A and 380A by a mechanism which is either electromagnetic, hydraulic or hybrid, as is known in the art. During a hijacking, gear 364A is prevented from meshing with gear 344A (thereby de-coupling onboard pilot control) by a mechanism which may be either electronic, electromagnetic, hydraulic or hybrid.

FIG. 10A illustrates one form of interruptible link 115 and 116.

Figure 10B:
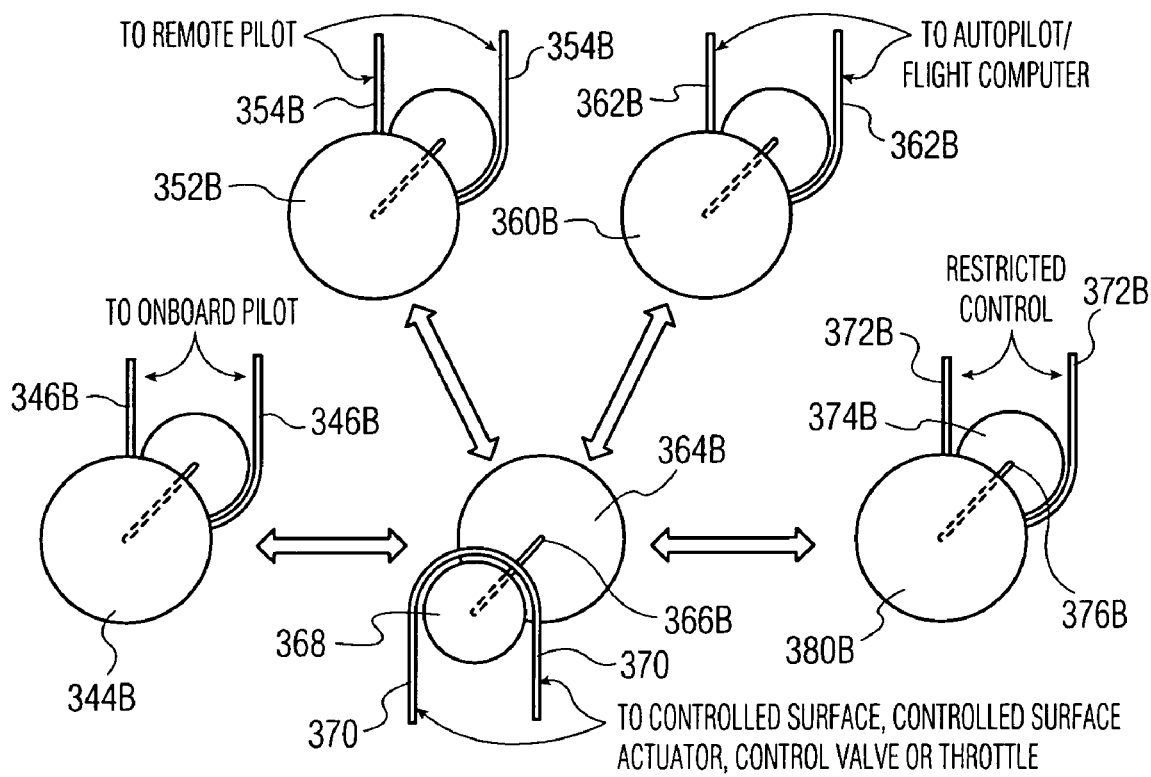

FIG. 10B shows an embodiment of the invention in which one of four sources of control [(a) onboard pilot, (b) remote pilot, (c) autopilot/flight computer and (d) restricted control], of the controlled element is selected by a clutch mechanism. The clutch mechanism links the rotational motion of one of wheels 344B, 352B, 360B and 380B to wheel 364B, thereby linking axial motion of one of cables 346B (on-board pilot control), 354B (remote pilot control), 362B (autopilot/flight computer control) or 372B (restricted control) to axial motion of cable 370 (controlled component motion).

In the case of on-board pilot control, axial movement of 346B is transmitted via 346B, 344B, 364B, 366B, 368, 370. In the case of remote pilot control, axial movement of 354B is transmitted via 354B, 352B, 364B, 366B, 368, 370. In the case of autopilot/flight computer control, axial movement of 362B is transmitted via the sequence 362B, 360B, 364B, 366B, 368, 370. In the case of restricted control, axial movement of 372B is transmitted via the sequence 372B, 374B, 376B, 380B, 364B, 366B, 368, 370.

The different formats and mechanisms for linking the rotation of wheel 364B with the rotation of one of wheels 344B, 352B, 360B and 380B include the same ones discussed in conjunction with FIG. 9B. During a hijacking, wheel 344B is prevented from contacting—either directly or indirectly— wheel 364B (thereby de-coupling on-board pilot control) by a mechanism which may be either electronic, electromagnetic, hydraulic or hybrid.

FIG. 10B illustrates one form of interruptible link 115 and 116.

Clutches which have been discussed hereinabove may be any one of a variety of clutches as are known in the art including friction clutches and no-slip clutches.

It is to be understood that the coupling and de-coupling of translational or rotational motion described in reference to FIGS. 2-10B may be accomplished by (a) other arrangements, (b) arrangements which include combinations of approaches presented in conjunction with FIGS. 2-10B and (c) combinations of (a) and (b). Any such arrangement which accomplishes the coupling and de-coupling discussed above is intended to be included in this invention.

Figure 11:
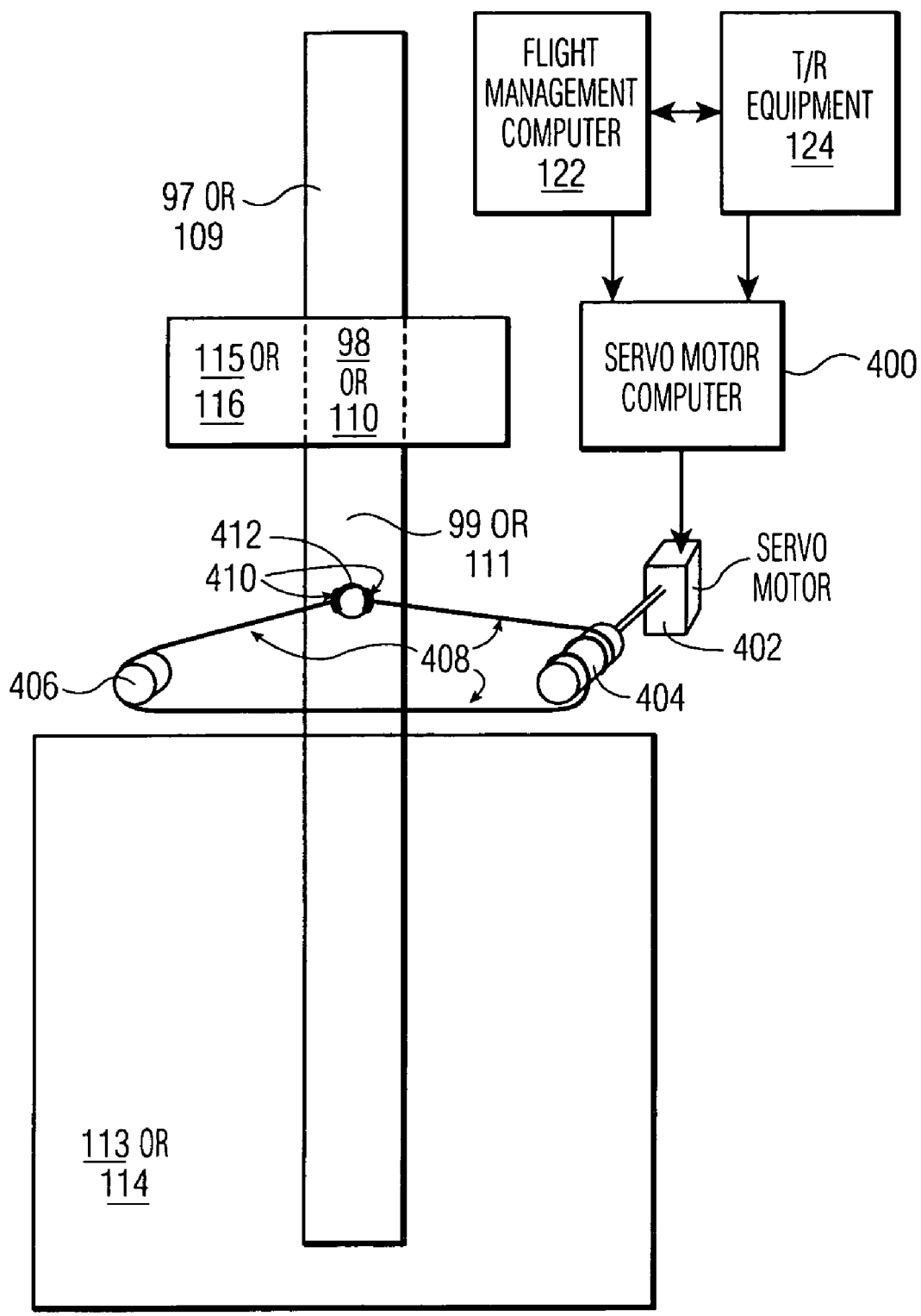
FIG. 11 is a block diagram of still another device for connecting alternate sources of control to a mechanical actuator.

FIG. 11 shows a means by which the non-disconnected segment (99 or 111) (hereinbelow referred to as the "distal" segment) of a mechanical control arm can be remotely controlled, to allow an alternate source of control to continue to perform the actions that the on-board pilot had performed prior to hijacking/button press/de-coupling of onboard pilot actions/disconnection of the upper segment (97 or 109) (hereinbelow referred to as the "proximal segment").

In the event of a hijacking the distal arm is moved by a cable system which is attached by anchors 410 in hole 412 of the distal arm. The cable 408 traverses passive wheel 406 and active wheel 404. Wheel 404 is rotated by servo motor 402, which is controlled by servo computer 400. Computer 400 is controlled by (a) signals from the transmitting/receiving equipment 124 on-board the hijacked aircraft (which is in communication with transmitting/receiving equipment at the site of the remote pilot) and (b) signals from the flight management computer 122.

Embodiments in which movement of the distal arm does not utilize a cable system are possible, e.g. using a gear arrangement attached to one or more servo motors. Embodiments in which hydraulic, pneumatic and magnetic forces are used to move the distal arm are also possible.

Figure 12:
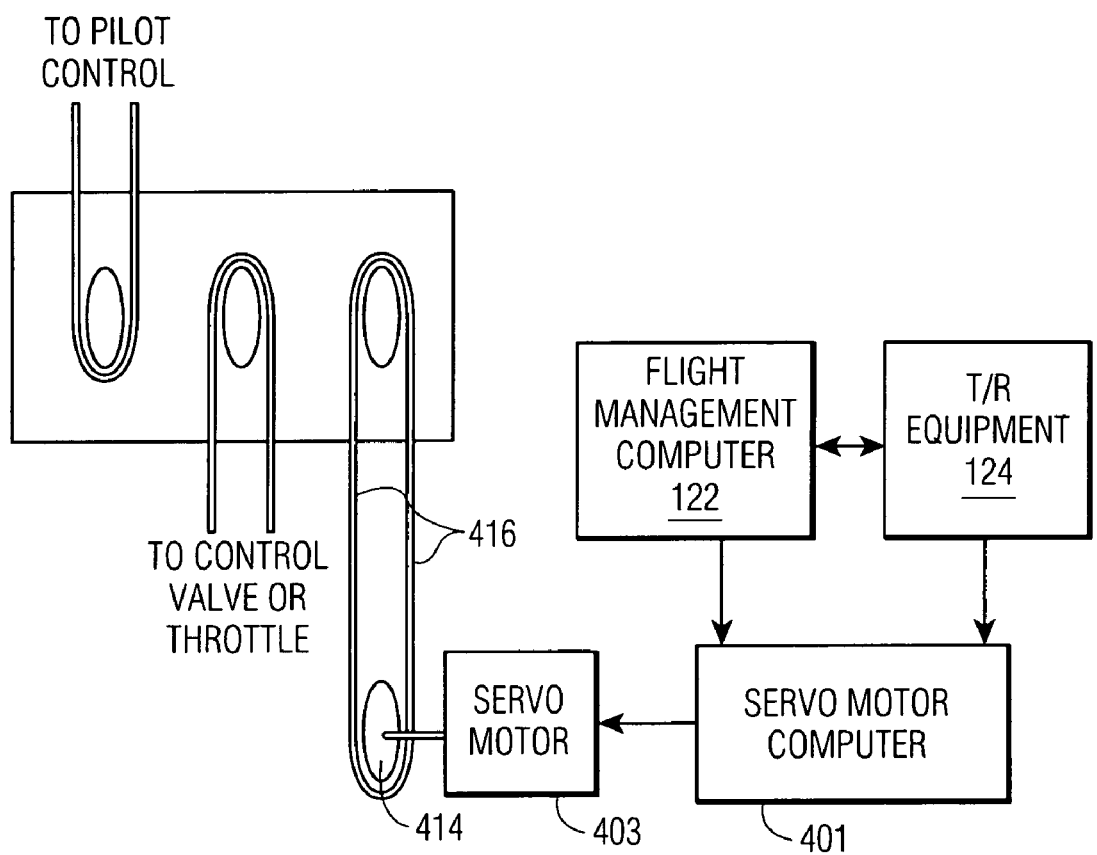
FIG. 12 is a block diagram illustrating another device for connecting alternate sources of control to a rotatable mechanical coupling element.

FIG. 12 shows a means which allows an alternate source of control to continue to perform the actions that the on-board pilot had performed prior to hijacking, on an aircraft which uses a cable system for one or more mechanical controls. Alternate source of control cable 416 (analogous, for example, to cable 196 in FIG. 4 and to cable 262 in FIG. 7 and to corresponding cables in FIGS. 5 and 6) allows the transmission of alternate source of control actions to mechanical components of the hijacked aircraft. The cable traverses wheel 414 which is rotated by servo motor 403, which is controlled by servo motor computer 401. Computer 401 is controlled by (a) signals from the transmitting/receiving equipment 124 on-board the hijacked aircraft and (b) signals from the flight management computer 122.

In the above discussion, the de-coupling of onboard pilot control is, with the exception of the method associated with FIG. 3, a potentially reversible act. The possibilities for actual system design include:

(a) making return to on-board pilot control impossible, with the lockout (other than in the case of FIG. 3 being electronic);

(b) making return to on-board pilot control fully reversible (except for FIG. 3);

(c) making return to on-board pilot partially reversible by allowing—under certain circumstances requiring off-aircraft approval—the on-board pilot to fly the aircraft in the same way that the remote pilot does. In this case, the mechanical interruptions performed at the time of button press would be irreversible.

The "Master Aircraft Control" (which selects control from among three sources: on-board pilot [MAC State 1], remote pilot [MAC State 2] and autopilot [MAC State 3]) is discussed in the above-mentioned U.S. Pat. No. 6,917,863 (see for example FIG. 13 of the aforementioned patent). With regard to the methods and apparatus presented herein, Master Aircraft Control may be localized, or, to varying degrees, delocalized. In FIGS. 4 through 7 herein, for example, element 115/116 include means for mechanically switching between MAC States 1 and 2, or between MAC States 1 and 3. FIG. 1 herein, on the other hand, shows a multiplicity of activations and deactivations at the time of button press, including each of the mechanical and electrical activations and deactivations associated with signal 112. Based on FIG. 1, Master Aircraft Control may be viewed as either (a) a function (with many sub-functions), or (b) as a piece (or pieces) of hardware which performs the aforementioned function.

All references to aircraft are intended to include helicopters, and vehicles which may at times function as a helicopter, and at times as a non-helicopter.

There has thus been shown and described a novel method and apparatus for disabling pilot control of a hijacked aircraft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Apparatus for disabling on-board pilot operation of an aircraft and transferring aircraft operation to an alternate source of control, said aircraft having at least one manually actuated control device for on-board human pilot control of at least one mechanical actuator, said actuator causing movement of one of (1) an aircraft engine throttle and (2) an aircraft attitude control surface, said at least one control device being mechanically connected to said at least one actuator, said alternate source of control comprising at least one of an autopilot, a flight control system and means for receiving control signals transmitted from a remote station, said signals representing commands by an off-aircraft human pilot, said apparatus comprising, in combination:

(a) means for receiving a first electric signal indicative of an emergency condition requiring the disabling of on-board pilot control of said aircraft;

(b) means for mechanically disconnecting said mechanical connection between said at least one control device and said at least one actuator in response to said first electric signal indicative of said emergency condition; and (c) means for mechanically connecting said at least one actuator with said alternate source of control, in response to said first electric signal indicative of said emergency condition.

2. The apparatus defined in claim 1, wherein said at least one control device is at least one of a yoke, at least one pedal, a control stick and a throttle control member.

3. The apparatus defined in claim 1, wherein said control surface is at least one of an aileron, a flap, an elevator and a rudder.

4. The apparatus defined in claim 1, further comprising means for sensing said emergency condition relating to said aircraft from a location on board said aircraft and generating said first electric signal in response thereto.

5. The apparatus defined in claim 1, further comprising means for sensing said emergency condition relating to said aircraft from a location remote from said aircraft and generating and transmitting said first electric signal to said aircraft in response thereto.

6. The apparatus defined in claim 1, further comprising means for maintaining off-aircraft human pilot control of said aircraft by transmitting said control signals representing commands of said off-aircraft human pilot to said aircraft.

7. The apparatus defined in claim 1, wherein means (b) includes (1) at least one removable pin extending through holes in at least two mechanical movable members, each movable member forming a part of one of said at least one control device and said at least one actuator, respectively, and (2) means responsive to said first electric signal for removing said pin, thereby to sever the connection between said movable members.

8. The apparatus defined in claim 1, wherein means (b) includes (1) at least one de-couple-able segment linking two portions of a mechanical member that extends between said at least one control device and said at least one actuator, and (2) means responsive to said first electric signal for de-coupling said segment, thereby to de-couple the connection between said at least one control device and said at least one actuator.

9. The apparatus defined in claim 8, wherein de-coupling means includes means responsive to said first electric signal for severing said segment, thereby to sever the connection between said at least one control device and said at least one actuator.

10. The apparatus defined in claim 8, wherein said de-coupling means includes means responsive to said first electric signal for removing said segment, thereby to sever the connection between said at least one control device and said at least one actuator.

11. The apparatus defined in claim 1, further comprising:
(d) means for producing a second electric signal indicative of an all-clear condition upon the termination of said emergency condition;
(e) means for disconnecting said at least one actuator from said alternate source of control in response to said second electric signal; and
(f) means for reconnecting said at least one control device to said at least one actuator in response to said second electric signal.

12. The apparatus defined in claim 1, wherein means (b) includes:
(1) two disks having parallel surfaces and a common center line, said disks each having one center hole and at least one non-center hole; a first one of said disks being mechanically coupled to said mechanically actuated control device such that said first disk rotates in response to pilot actions upon said control device and a second one of said disks being mechanically coupled to said at least one actuator such that the rotation of said second disk causes said actuator to move said at least one of said throttle and said control surface;
(2) at least one movable rigid rod which may be positioned to pass through said non-center hole in at least one of said disks; and
(3) means responsive to said first electric signal for moving said rod;
wherein
(1) in a first position of said rod, said rod is positioned to pass through a non-center hole in each of said first disk and said second disk and thereby couple rotational motion from said first disk to said second disk and thereby mechanically couple onboard pilot actions to said at least one mechanical actuator;
(2) in a second position of said rod, said rod is positioned to not pass through both of (i) a non-center hole in said first disk and (ii) a non-center hole in said second disk, thereby preventing the coupling of rotational motion from said first disk to said second disk and disabling onboard pilot actions from moving said at least one mechanical actuator; and
(3) said first electric signal causes the movement of said rod from said first position to said second position.

13. The apparatus defined in claim 1, wherein means (c) includes: (1) two disks having parallel surfaces and a common center line, said disks each having one center hole and at least one non-center hole; a first one of said disks being mechanically coupled to said alternate source of control such that said first disk rotates in response to actions of said alternate source of control, and a second one of said disks being mechanically coupled to said at least one actuator such that the rotation of said second disk causes said actuator to move said at least one of said throttle and said control surface;
(2) at least one movable rigid rod positioned to pass through said non-center hole in at least one of said disks; and
(3) means responsive to said first electric signal for moving said rod;
wherein
(1) in a first position of said rod, said rod is positioned to pass through a non-center hole in each of said first disk and said second disk and thereby couple rotational motion from said first disk to said second disk and thereby mechanically couple said alternate source of control to said at least one mechanical actuator;
(2) in a second position of said rod, said rod is positioned to not pass through both of (i) a non-center hole in said first disk and (ii) a non-center hole in said second disk, thereby preventing the coupling of rotational motion from said first disk to said second disk and thereby preventing the coupling of said alternate source of control to said at least one mechanical actuator; and
(3) said first electric signal causes the movement of said rod from said second position and said first position.

14. The apparatus defined in claim 1, wherein means (b) includes:
(1) two disks having parallel surfaces and a common center line, said disks each having one center hole, a first one of said disks being mechanically coupled to said mechanically actuated control device such that said disk rotates in response to pilot actions upon said control device, and a second one of said disks being mechanically coupled to said at least one actuator such that the rotation of said second disk causes said actuator to move said at least one of said throttle and said control surface;
(2) a rigid rod which is positioned to pass through said center holes in said disks; and
(3) means responsive to said first electric signal for reversibly coupling the rotational motion of at least one said disk to said rigid rod;

wherein
- (1) in a first apparatus state, said reversible coupling means couples the rotation of said first disk to the rotation of said second disk via said rigid rod, thereby mechanically coupling onboard pilot actions to said at least one mechanical actuator;
- (2) in a second apparatus state, said reversible coupling means de-couples the rotation of said first disk from the rotation of said second disk, thereby de-coupling onboard pilot actions from said at least one mechanical actuator; and
- (3) said first electric signal causes the transition from said first apparatus state to said second apparatus state.

15. The apparatus defined in claim 1, wherein means (c) includes:
- (1) two disks having parallel surfaces and identical center lines, said disks each having one center hole, a first one of said disks being mechanically coupled to said alternate source of control such that said disk rotates in response to actions of said alternate source of control, and a second one of said disks being mechanically coupled to said at least one actuator such that the rotation of said second disk causes said actuator to move said at least one of said throttle and said control surface;
- (2) a rigid rod positioned to pass through said center holes in each of said disks; and
- (3) means responsive to said first electric signal for reversibly coupling the rotational motion of at least one said disk to said rigid rod;

wherein
- (1) in a first apparatus state, said reversible coupling means couples the rotation of said first disk to the rotation of said second disk via said rigid rod, and thereby mechanically couples said alternate source of control to said at least one mechanical actuator;
- (2) in a second apparatus state, said reversible coupling means de-couples the rotation of said first disk from the rotation of said second disk, and thereby de-couples said alternate source of control from said at least one mechanical actuator; and
- (3) said first electric signal causes the transition from said second apparatus state to said first apparatus state.

16. The apparatus defined in claim 12, further comprising:
- (4) means for producing a second electric signal indicative of an all-clear condition upon the termination of said emergency condition; and
- (5) means responsive to said second electric signal for moving said rod;
wherein said second electric signal causes the movement of said rod from said second position to said first position.

17. The apparatus defined in claim 13, further comprising:
- (4) means for producing a second electric signal indicative of an all-clear condition upon the termination of said emergency condition; and
- (5) means responsive to said second electric signal for moving said rod;
wherein said second electric signal causes the movement of said rod from said first position to said second position.

18. The apparatus defined in claim 14, further comprising:
- (4) means for producing a second electric signal indicative of an all-clear condition upon the termination of said emergency condition; and
- (5) means responsive to said second electric signal for reversibly coupling the rotational motion of at least one said disk to said rigid rod;
wherein said second electric signal causes the transition from said second apparatus state to said first apparatus state.

19. The apparatus defined in claim 15, further comprising:
- (4) means for producing a second electric signal indicative of an all-clear condition upon the termination of said emergency condition; and
- (5) means responsive to said second electric signal for reversibly coupling the rotational motion of at least one said disk to said rigid rod;
wherein said second electric signal causes the transition from said first apparatus state to said second apparatus state.

20. The apparatus defined in claim 1, wherein means (b) includes:
- (1) two disks each having a center hole, a first one of said disks being mechanically coupled to said mechanically actuated control device such that said first disk rotates in response to pilot actions upon said control device, and a second one of said disks being mechanically coupled to said at least one actuator such that the rotation of said second disk causes said actuator to move said at least one of said throttle and said control surface;
- (2) a first rigid rod positioned to pass through said center hole in said first disk, said first rigid rod being affixed to said first disk such that the angular rotation of said first rigid rod is identical to the angular rotation of said first disk;
- (3) a second rigid rod positioned to pass through said center hole in said second disk, said second rigid rod being affixed to said second disk such that the angular rotation of said second rigid rod is identical to the angular rotation of said second disk;
- (4) a mechanical connection between said first rigid rod and said second rigid rod such that the rotation of said first rigid rod causes the rotation of said second rigid rod; and
- (5) means responsive to said first electric signal for uncoupling said mechanical connection so that the rotational motion of said first rigid rod does not cause rotation of said second rigid rod;
whereby said first electric signal causes the uncoupling of said mechanical connection between said first rigid rod and said second rigid rod, thereby de-coupling onboard pilot actions from said at least one mechanical actuator.

21. The apparatus defined in claim 20, wherein said mechanical connection includes a removable link which links said first rigid rod and said second rigid rod, and wherein means (5) cause the removal of said link in response to said first electric signal.

22. The apparatus defined in claim 21, wherein means (5) includes means for preventing re-coupling of said mechanical connection until after the termination of said emergency condition, whereby said first electric signal causes the removal of onboard pilot control of at least one manually actuated control device until after the termination of said emergency condition.

23. The apparatus defined in claim 20, further comprising:
- (6) means for producing a second electric signal indicative of an all-clear condition upon the termination of said emergency condition; and
- (7) means responsive to said second electric signal for re-coupling a previously uncoupled mechanical connection, so that said rotational motion of said first rigid rod causes rotation of said second rigid rod;
whereby said second electric signal causes the re-coupling of said mechanical connection between said first rigid rod and said second rigid rod, thereby re-coupling onboard pilot actions to said at least one mechanical actuator.

24. The apparatus defined in claim 21, further comprising:
(6) means for producing a second electric signal indicative of an all-clear condition upon the termination of said emergency condition; and
(7) means responsive to said second electric signal for re-inserting said removable link, thereby re-establishing the state in which said rotational motion of said first rigid rod causes rotation of said second rigid rod;
whereby said second electric signal causes the re-coupling of said mechanical connection between said first rigid rod and said second rigid rod, thereby re-coupling onboard pilot actions to said at least one mechanical actuator.

25. The apparatus defined in claim 20, wherein said disks have parallel surfaces and a common center line.

26. The apparatus defined in claim 20, wherein said disks have parallel surfaces and differing center lines.

27. The apparatus defined in claim 1, wherein means (b) includes:
(1) two disks each having a center hole, a first one of said disks being linked by a first mechanical coupling to said mechanically actuated control device such that said first disk rotates in response to pilot actions upon said control device, and a second one of said disks being mechanically coupled to said at least one actuator such that the rotation of said second disk causes said actuator to move said at least one of said throttle and said control surface;
(2) a rod positioned to pass through said center hole in each of said first disk and said second disk, said rod fixed to said first disk and said second disk such that the angular rotation of said first disk is identical to the angular rotation of said second disk;
(3) a first mechanical coupling including at least one of a cable and a belt for transmitting torque from said mechanically actuated control device to said first disk;
(4) tension controlling means positioned to control the path of said at least one cable and belt such that said tension controlling means controls whether said at least one cable and belt are held in a taut state; and
(5) means responsive to said first electric signal for controlling said mechanical connection by controlling said tension controlling means;
wherein
(1) In a taut state, said at least one cable and belt transmit torque from said mechanically actuated control device to said first disk;
(2) In a slack state, said at least one cable and belt do not transmit torque from said mechanically actuated control device to said first disk; and
(3) said first electric signal causes said tension controlling means to cause the transition from a taut state to a slack state, thereby de-coupling onboard pilot actions from said at least one mechanical actuator.

28. The apparatus defined in claim 27, wherein said tension controlling means includes:
(1) at least one wheel with a circumferential groove through which said at least one cable and belt pass; and
(2) an electromagnetic actuating mechanism, which causes said first electric signal to alter the position of said at least one wheel;
wherein
(1) the position of the center of said at least one wheel determines the tension of said at least one cable and belt; and
(2) said first electric signal causes said electromagnetic actuating mechanism to alter the position of said wheel such that said at least one cable and belt transition from a taut state to a slack state.

29. The apparatus defined in claim 1, wherein means (c) includes:
(1) two disks each having a center hole, a first one of said disks being linked by a first mechanical coupling to said alternate source of control such that said first disk rotates in response to actions of said alternate source of control, and a second one of said disks being mechanically coupled to said at least one actuator such that the rotation of said second disk causes said actuator to move said at least one of said throttle and said control surface;
(2) a rod positioned to pass through said center hole in each of said first disk and said second disk, said rod fixed to said first disk and said second disk such that the angular rotation of said first disk is identical to the angular rotation of said second disk;
(3) a first mechanical coupling including at least one of a cable and a belt for transmitting torque from said alternate source of control to said first disk;
(4) tension controlling means positioned to control the path of said at least one cable and belt such that said tension controlling means controls whether said at least one cable and belt are held in a taut state; and
(5) means responsive to said first electric signal for controlling said mechanical connection by controlling said tension controlling means;
wherein
(1) In a taut state, said at least one cable and belt transmit torque from said alternate source of control to said first disk;
(2) In a slack state, said at least one cable and belt do not transmit torque from said alternate source of control to said first disk; and
(3) said first electric signal causes said tension controlling means to cause the transition from a slack state to a taut state, thereby coupling said alternate source of control to said at least one mechanical actuator.

30. The apparatus defined in claim 29, wherein said tension controlling means includes:
(1) at least one wheel with a circumferential groove through which said at least one cable and belt pass; and
(2) an electromagnetic actuating mechanism, which causes said electric signal to alter the position of said at least one wheel;
wherein
(1) the position of the center of said at least one wheel determines the tension of said at least one cable and belt; and
(2) said first electric signal causes said electromagnetic actuating mechanism to alter the position of said wheel such that said at least one cable and belt transition from a slack state to a taut state.

31. The apparatus defined in claim 27, further comprising:
(6) means for producing a second electric signal indicative of an all-clear condition upon the termination of said emergency condition; and
(7) means responsive to said second electric signal for controlling said mechanical connection by controlling said tension controlling means;
wherein said second electric signal causes said tension controlling means to cause the transition from a slack state to a taut state, thereby re-coupling said mechanically actuated control device to said at least one mechanical actuator.

32. The apparatus defined in claim 31, wherein said tension controlling means includes:
(1) at least one wheel with a circumferential groove through which said at least one cable and belt pass; and
(2) an electromagnetic actuating mechanism, which causes said electric signal to alter the position of said at least one wheel;
wherein
(1) the position of the center of said at least one wheel determines the tension of said at least one cable and belt; and
(2) said second electric signal causes said electromagnetic actuating mechanism to alter the position of said wheel such that said at least one cable and belt transition from a slack state to a taut state.

33. The apparatus defined in claim 29, further comprising:
(6) means for producing a second electric signal indicative of an all-clear condition upon the termination of said emergency condition; and
(7) means responsive to said second electric signal for controlling said mechanical connection by controlling said tension controlling means;
wherein said second electric signal causes said tension controlling means to cause the transition from a taut state to a slack state, thereby de-coupling said alternate source of control from said at least one mechanical actuator.

34. The apparatus defined in claim 33 wherein said tension controlling means includes:
(1) at least one wheel with a circumferential groove through which said at least one cable and belt pass; and
(2) an electromagnetic actuating mechanism, which causes said electric signal to alter the position of said at least one wheel;
wherein
(1) the position of the center of said at least one wheel determines the tension of said at least one cable and belt; and
(2) said second electric signal causes said electromagnetic actuating mechanism to alter the position of said wheel such that said at least one cable and belt transition from a taut state to a slack state.

35. The apparatus defined in claim 1, wherein means (b) includes:
(1) two disks each having parallel surfaces and a common center line, a first one of said disks being mechanically coupled to said mechanically actuated control device such that said first disk rotates in response to on-board pilot actions upon said control device, and a second one of said disks being mechanically coupled to said at least one actuator such that the rotation of said second disk causes said actuator to move said at least one of said throttle and said control surface;
(2) first mechanical means for the transmission of torque from the rotation of said first disk to said second disk;
(3) second mechanical means for selectively controlling the transmission of said torque from said first disk to said second disk; and
(4) means responsive to said first electric signal for controlling said second mechanical means for selectively coupling the rotational motion of said first disk to said second disk;
wherein
(1) in a first apparatus state, said second mechanical means couples the rotation of said first disk to the rotation of said second disk via said first mechanical means, thereby mechanically coupling onboard pilot actions to said at least one mechanical actuator;
(2) in a second apparatus state, said second mechanical means de-couples the rotation of said first disk from the rotation of said second disk, thereby de-coupling onboard pilot actions from said at least one mechanical actuator; and
(3) said first electric signal causes said second mechanical means to cause the transition from said first apparatus state to said second apparatus state.

36. The apparatus defined in claim 35, wherein said first mechanical means comprises a fluid containing chamber allowing the transmission of torque from said first disk, to said fluid and thence to said second disk, and wherein said second mechanical means:
(1) in a first chamber state allows said transmission; and
(2) in a second chamber state does not allow said transmission.

37. The apparatus defined in claim 36, wherein said fluid containing chamber forms a clutch.

38. The apparatus defined in claim 1, wherein means (c) includes:
(1) two disks each having parallel surfaces and a common center line, a first one of said disks being mechanically coupled to said alternate source of control such that said first disk rotates in response to actions of said alternate source of control, and a second one of said disks being mechanically coupled to said at least one actuator such that the rotation of said second disk causes said actuator to move said at least one of said throttle and said control surface;
(2) first mechanical means for the transmission of torque from the rotation of said first disk to said second disk;
(3) second mechanical means for selectively controlling the transmission of said torque from said first disk to said second disk; and
(4) means responsive to said first electric signal for controlling said second mechanical means for selectively coupling the rotational motion of said first disk to said second disk;
wherein
(1) in a first apparatus state, said second mechanical means de-couples the rotation of said first disk from the rotation of said second disk via said first mechanical means, thereby mechanically uncoupling said alternate source of control from said at least one mechanical actuator;
(2) in a second apparatus state, said second mechanical means couples the rotation of said first disk to the rotation of said second disk, thereby coupling said alternate source of control to said at least one mechanical actuator; and
(3) said first electric signal causes said second mechanical means to cause the transition from said first apparatus state to said second apparatus state.

39. The apparatus defined in claim 38, wherein said first mechanical means comprises a fluid containing chamber allowing the transmission of torque from said first disk, to said fluid and thence to said second disk, and wherein said second mechanical means:
(1) in a first chamber state allows said transmission; and
(2) in a second chamber state does not allow said transmission.

40. The apparatus defined in claim 39, wherein said fluid containing chamber forms a clutch.

41. The apparatus defined in claim 35, further comprising:
(5) means for producing a second electric signal indicative of an all-clear condition upon the termination of said emergency condition; and
(6) means responsive to said second electric signal for controlling said second mechanical means for re-coupling the rotational motion of said first disk to said second disk;
wherein said second electric signal causes said second mechanical means to cause the transition from said second apparatus state to said first apparatus state.

42. The apparatus defined in claim 41, wherein said first mechanical means comprises a fluid containing chamber allowing the transmission of torque from one of said first disk, to said fluid and thence to said second disk, and wherein said second mechanical means:
(1) in a first chamber state allows said transmission; and
(2) in a second chamber state does not allow said transmission.

43. The apparatus defined in claim 42, wherein said fluid containing chamber forms a clutch.

44. The apparatus defined in claim 38, further comprising:
(5) means for producing a second electric signal indicative of an all-clear condition upon the termination of said emergency condition; and
(6) means responsive to said second electric signal for controlling said second mechanical means for de-coupling the rotational motion of said first disk from said second disk;
wherein said second electric signal causes said second mechanical means to cause the transition from said second apparatus state to said first apparatus state.

45. The apparatus defined in claim 44, wherein said first mechanical means comprises a fluid containing chamber allowing the transmission of torque from said first disk, to said fluid and thence to said second disk, and wherein said second mechanical means:
(1) in a first chamber state allows said transmission; and
(2) in a second chamber state does not allow said transmission.

46. The apparatus defined in claim 45, wherein said fluid containing chamber forms a clutch.

47. The apparatus defined in claim 1, further comprising:
(1) three disks, a first one of said disks being mechanically coupled to said mechanically actuated control device such that said first disk rotates in response to onboard pilot actions upon said control device, a second one of said disks being mechanically coupled to said alternate source of control, a third one of said disks being mechanically coupled to said at least one actuator such that the rotation of said third disk causes said actuator to move said at least one of said throttle and said control surface;
(2) first mechanical means for the transmission of torque from the rotation of said first disk to said third disk, and from said second disk to said third disk;
(3) second mechanical means for selectively controlling the transmission of said torque from said first disk to said third disk, and from said second disk to said third disk; and
(4) means responsive to said first electric signal for controlling said second mechanical means;
wherein,
(1) in a first apparatus state, said second mechanical means couples the rotation of said first disk to the rotation of said third disk via said first mechanical means, thereby mechanically coupling said on-board pilot to said at least one mechanical actuator;
(2) in a second apparatus state, said second mechanical means couples the rotation of said second disk to the rotation of said third disk via said first mechanical means, thereby mechanically coupling said alternate source of control to said at least one mechanical actuator;
(3) said first electric signal causes said second mechanical means to cause a transition from said first apparatus state to said second apparatus state, thereby disabling on-board pilot control and enabling said alternate source of control.

48. The apparatus defined in claim 47, wherein said first mechanical means comprises a fluid containing chamber, said chamber allowing the transmission of torque from said first disk to said fluid and thence to said third disk, and from said second disk to said fluid and thence to said third disk, and wherein said second mechanical means:
(1) in a first apparatus state allows transmission of torque from said first disk to said third disk, and does not allow transmission of torque from said second disk to said third disk; and
(2) in a second apparatus state allows transmission of torque from said second disk to said third disk, and does not allow transmission of torque from said first disk to said third disk.

49. The apparatus defined in claim 48, wherein said fluid containing chamber forms a clutch.

50. The apparatus defined in claim 47, wherein:
(a) said first disk is further mechanically coupled to a first gear wheel such that rotation of said first disk causes rotation of said first gear wheel;
(b) said second disk is further mechanically coupled to a second gear wheel such that rotation of said second disk causes rotation of said second gear wheel;
(c) said third disk is further mechanically coupled to a third gear wheel such that rotation of said third gear wheel causes rotation of said third disk;
(d) said first mechanical means controls the relative position of said first gear wheel and said third gear wheel, and the relative position of said second gear wheel and said third gear wheel;
(e) said second mechanical means:
(1) in a first apparatus state causes transmission of torque from said first gear wheel to said third gear wheel by causing the meshing of said respective gear wheels, thereby mechanically coupling said on-board pilot to said at least one mechanical actuator; and
(2) in a second apparatus state causes transmission of torque from said second gear wheel to said third gear wheel by causing the meshing of said respective gear wheels, thereby mechanically coupling said alternate source of control to said at least one mechanical actuator.

51. The apparatus defined in claim 20, wherein:
(a) said first disk is further mechanically coupled to a first gear wheel such that rotation of said first disk causes rotation of said first gear wheel;
(b) said second disk is further mechanically coupled to a second gear wheel such that rotation of said second gear wheel causes rotation of said second disk;
(c) said first mechanical connection controls the relative position of said first gear wheel and said second gear wheel;
(d) said means (5):

in a first apparatus state causes transmission of torque from said first gear wheel to said second gear wheel by causing the meshing of said gear wheels, thereby mechanically coupling said on-board pilot to said at least one mechanical actuator; and (2) in a second apparatus state prevents transmission of torque from said first gear wheel to said second gear wheel by preventing the meshing of said gear wheels, thereby mechanically uncoupling said on-board pilot from said at least one mechanical actuator.

52. The apparatus defined in claim 47, further comprising:

(5) means for producing a second electric signal indicative of an all-clear condition upon the termination of said emergency condition; and (6) means responsive to said second electric signal for controlling said second mechanical means;

wherein said second electric signal causes said second mechanical means to cause the transition from said second apparatus state to said first apparatus state, thereby re-enabling on-board pilot control and disabling said alternate source of control.

53. The apparatus defined in claim 52, wherein said first mechanical means comprises a fluid containing chamber, said chamber allowing the transmission of torque from said first disk to said fluid and thence to said third disk, and from said second disk to said fluid and thence to said third disk, and wherein said second mechanical means:

(1) in a first apparatus state allows transmission of torque from said first disk to said third disk; and (2) in a second apparatus state allows transmission of torque from said second disk to said third disk.

54. The apparatus defined in claim 53, wherein said fluid containing chamber forms a clutch.

55. The apparatus define in claim 35, further comprising:

(1) two alternate source disks each having parallel surfaces and a common center line, a first one of said alternate source disks being mechanically coupled to said alternate source of control such that said first alternate source disk rotates in response to actions of said alternate source of control, and a second one of said alternate source disks being mechanically coupled to said at least one actuator such that the rotation of said second alternate source disk causes said actuator to move said at least one of said throttle and said control surface;

(2) third mechanical means for the transmission of torque from the rotation of said first alternate source disk to said second alternate source disk;

(3) fourth mechanical means for selectively controlling the transmission of said torque from said first alternate source disk to said second alternate source disk; and (4) two remote pilot disks each having parallel surfaces and identical center lines, a first remote pilot disks being mechanically coupled to said electromechanical actuator such that said first remote pilot disk rotates in response to actions of said receiving means, and a second remote pilot disk being mechanically coupled to said alternate source of control;

(5) fifth mechanical means for the transmission of torque from the rotation of said first remote pilot disk to said second remote pilot disk;

(6) sixth mechanical means for selectively controlling the transmission of torque from said first remote pilot disk to said second remote pilot disk; and (7) two autopilot/flight control system disks, said autopilot/flight control system disks having parallel surfaces and identical center lines, a first autopilot/flight control system disk being mechanically coupled to at least one of said autopilot and said flight control system such that said first autopilot/flight control system disk rotates in response to actions of said at least one autopilot and flight control system, and a second autopilot/flight control system disk being mechanically coupled to said alternate source of control;

(8) seventh mechanical means for the transmission of torque from the rotation of said first autopilot/flight control system to said second autopilot/flight control system disk;

(9) eighth mechanical means for selectively controlling the transmission of torque from said first autopilot/flight control system disk to said second autopilot/flight control system disk;

(10) means further responsive to said first electric signal for coupling the rotational motion of said first alternate source disk to said second alternate source disk;

(11) means for producing a second electric signal indicative of an all-clear condition upon the termination of said emergency condition;

(12) means responsive to said second electric signal for (i) re-coupling the rotational motion of said first disk to said second disk, and (ii) de-coupling the rotational motion of said first alternate source disk from said second alternate source disk;

(13) means for producing a third electric signal to cause a remote pilot control state during an emergency condition;

(14) means for producing fourth electric signal to cause an autopilot/flight control system control state during an emergency condition;

(15) means responsive to said third electric signal for (i) reversibly coupling the rotational motion of said first remote pilot disk to said second remote pilot disk, and (ii) de-coupling the rotational motion of said first autopilot/flight control system disk from said second autopilot/flight control system disk; and

(16) means responsive to said fourth electric signal for (i) reversibly coupling the rotational motion of said first autopilot/flight control system disk to said second autopilot/flight control system disk, and (ii) de-coupling the rotational motion of said first remote pilot disk from said second remote pilot disk;

wherein (1) in a first apparatus state, said fourth mechanical means de-couples the rotation of said first alternate source disk to the rotation of said second alternate source disk via said third mechanical means, thereby mechanically de-coupling said alternate source of control from said at least one mechanical actuator;

(2) in a second apparatus state, said fourth mechanical means couples the rotation of said first alternate source disk to the rotation of said second alternate source disk, thereby coupling said alternate source of control to said at least one mechanical actuator;

(3) said first electric signal further causes said fourth mechanical means to cause the transition from said first apparatus state to said second apparatus state;

(4) said second electric signal causes the transition from said second apparatus state to said first apparatus state;

(5) in a first alternate source state, said sixth mechanical means couples the rotation of said first remote pilot disk to the rotation of said second remote pilot disk via said fifth mechanical means, thereby mechanically coupling said electromechanical actuator to said alternate source of control, and said eighth mechanical means de-couples the rotation of said first autopilot/flight control system disk from the rotation of said second autopilot/flight control system disk via said seventh mechanical means, thereby mechanically de-coupling said autopilot/flight control system from said alternate source of control;
(6) in a second alternate source state said sixth mechanical means de-couples the rotation of said first remote pilot disk from the rotation of said second disk via said fifth mechanical means, thereby mechanically de-coupling said electromechanical actuator from said alternate source of control, and said eighth mechanical means couples the rotation of said first autopilot/flight control system disk to the rotation of said second autopilot/flight control system disk via said seventh mechanical means, thereby mechanically coupling said autopilot/flight control system to said alternate source of control;
(7) said third electric signal causes the transition from said second alternate source state to said first alternate source state; and
(8) said fourth electric signal causes the transition from said first alternate source state to said second alternate source state.

56. The apparatus defined in claim 55, wherein
(1) said first mechanical means comprises a fluid containing chamber, said chamber allowing the transmission of torque from said first disk, to said fluid and thence to said second disk, and wherein said second mechanical means:
(a) in a first apparatus state allows said transmission from said first disk to said second disk; and
(b) in a second apparatus state does not allow said transmission from said first disk to said second disk;
(2) said third mechanical means comprises a fluid containing chamber, said chamber allowing the transmission of torque from said first alternate source disk, to said fluid and thence to said second alternate source disk, and wherein said fourth mechanical means:
(a) in a second apparatus state allows said transmission from said first alternate source disk, to said second alternate source disk; and
(b) in a first apparatus state does not allow said transmission from said first alternate source disk, to said second alternate source disk;
(3) said fifth mechanical means comprises a fluid containing chamber, said chamber allowing the transmission of torque from said first remote pilot disk, to said fluid and thence to said second remote pilot disk, and wherein said sixth mechanical means:
(a) in a first alternate source state allows said transmission from said first remote pilot disk, to said second remote pilot disk; and
(b) in a second alternate source state does not allow said transmission from said first remote pilot disk, to said second remote pilot disk;
(4) said seventh mechanical means comprises a fluid containing chamber, said chamber allowing the transmission of torque from said first autopilot/flight control system pilot disk, to said fluid and thence to said second autopilot/flight control system disk; and
(5) said eighth mechanical means:
(a) in a second alternate source state allows said transmission from said first autopilot/flight control system pilot disk, to said second autopilot/flight control system disk; and
(b) in a first alternate source state does not allow said transmission from said first autopilot/flight control system pilot disk, to said second autopilot/flight control system disk;

wherein
(1) in a first control state, said second mechanical means and said fourth mechanical means are in a first apparatus state, allowing on-board pilot control of said aircraft;
(2) in a second control state, said second mechanical means and said fourth mechanical means are in a second apparatus state, and said sixth mechanical means and said eighth mechanical means are in a first alternate source state, allowing remote pilot control of said aircraft; and
(3) in a third control state, said second mechanical means and said fourth mechanical means are in a second apparatus state, and said sixth mechanical means and said eighth mechanical means are in a second alternate source state, allowing at least one of said autopilot and said flight control system control of said aircraft.

57. The apparatus defined in claim 56, wherein each of said fluid containing chambers forms a clutch.

58. The apparatus defined in claim 1, further comprising:
(1) three disks, a first disk being mechanically coupled to said mechanically actuated control device such that said first disk rotates in response to on-board pilot actions upon said control device, a second disk being mechanically coupled to said alternate source of control, a third disk being mechanically coupled to said at least one actuator such that the rotation of said third disk causes said actuator to move said at least one of said throttle and said control surface;
(2) first mechanical means for the transmission of torque from the rotation of said first disk to said third disk, and from said second disk to said third disk;
(3) second mechanical means for selectively controlling the transmission of said torque from said first disk to said third disk, and from said second disk to said third disk;
(4) means further responsive to said first electric signal for controlling said second mechanical means;
(5) three additional disks, a first additional disk being mechanically coupled to said receiving means such that said first additional disk rotates in response to remote pilot actions, a second additional disk being mechanically coupled to said autopilot/flight control system, a third additional disk being mechanically coupled to said alternate source of control such that the rotation of said third additional disk causes said alternate source of control to cause the rotation of said second disk;
(6) third mechanical means for the transmission of torque from the rotation of said first additional disk to said third additional disk, and from said second additional disk to said third additional disk;
(7) fourth mechanical means for selectively controlling the transmission of said torque from said first additional disk to said third additional disk, and from said second additional disk to said third additional disk; and
(8) means for producing a remote pilot enabling electric signal to cause a remote pilot control state during an emergency condition;
(9) means for producing an autopilot/flight control system enabling electric signal to cause an autopilot/flight control system control state during an emergency condition; and
(10) means further responsive to said remote pilot enabling electric signal and said autopilot/flight control system enabling signals for controlling said second and said fourth mechanical means;
wherein,
(1) in an on-board pilot control state, said second mechanical means couples the rotation of said first disk to the rotation of said third disk via said first mechanical means, thereby mechanically coupling said on-board pilot to said at least one mechanical actuator;

(2) in a remote pilot control state, (a) said first electric signal causes said second mechanical means to couple the rotation of said second disk to the rotation of said third disk via said first mechanical means, thereby mechanically coupling said alternate source of control to said at least one mechanical actuator; and (b) said remote pilot enabling electric signal causes said fourth mechanical means to couple the rotation of said first additional disk to the rotation of said third additional disk via said third mechanical means, thereby mechanically coupling said receiving means to said alternate source of control; and (3) in an autopilot/flight control system control state, (a) said first electric signal causes said second mechanical means to couple the rotation of said second disk to the rotation of said third disk via said first mechanical means, thereby mechanically coupling said alternate source of control to said at least one mechanical actuator; and (b) said autopilot/flight control system enabling signal causes said fourth mechanical means to couple the rotation of said second additional disk to the rotation of said third additional disk via said third mechanical means, thereby mechanically coupling said autopilot/ flight control system to said alternate source of control.

59. The apparatus defined in claim 58, wherein
(a) said first mechanical means comprises a first fluid-containing chamber, said first fluid-containing chamber allowing the transmission of torque from said first disk to a first fluid and thence to said third disk, and from said second disk to said first fluid and thence to said third disk;
(b) said second mechanical means:
(1) in an onboard pilot control state allows transmission of torque from said first disk to said third disk and does not allow transmission of torque from said second disk to said third disk; and
(2) in a remote pilot control state and in an autopilot/flight control system control state, allows transmission of torque from said second disk to said third disk and does not allow transmission of torque from said first disk to said third disk;
(c) said third mechanical means comprises a second fluid-containing chamber, said second fluid-containing chamber allowing the transmission of torque from said first additional disk to a second fluid and thence to said third additional disk, and from said second additional disk to said second fluid and thence to said third additional disk;
(d) said fourth mechanical means:
(1) in a remote pilot control state allows transmission of torque from said first additional disk to said third additional disk and does not allow transmission of torque from said second additional disk to said third additional disk; and
(2) in an autopilot/flight control system control state, allows transmission of torque from said second additional disk to said third additional disk and does not allow transmission of torque from said first additional disk to said third additional disk.

60. The apparatus defined in claim 59, wherein each of said fluid containing chambers forms a clutch.

61. The apparatus defined in claim 58, further comprising:
(11) means for producing a second electric signal indicative of an all-clear condition upon the termination of said emergency condition; and

(12) means responsive to said second electric signal for controlling said second mechanical means;
wherein said second electric signal causes said second mechanical means to cause the transition from said remote pilot control state to said on-board pilot control state, and from said autopilot/flight control system control state to said on-board pilot control state, thereby re-enabling on-board pilot control.

62. The apparatus defined in claim 61, wherein
(a) said first mechanical means comprises a first fluid-containing chamber, said first fluid-containing chamber allowing the transmission of torque from said first disk to a first fluid and thence to said third disk, and from said second disk to said first fluid and thence to said third disk;
(b) said second mechanical means:
(1) in an onboard pilot control state allows transmission of torque from said first disk to said third disk and does not allow transmission of torque from said second disk to said third disk; and
(2) in a remote pilot control state and in an autopilot/flight control system control state, allows transmission of torque from said second disk to said third disk and does not allow transmission of torque from said first disk to said third disk;
(c) said third mechanical means comprises a second fluid-containing chamber, said second fluid-containing chamber allowing the transmission of torque from said first additional disk to a second fluid and thence to said third additional disk, and from said second additional disk to said second fluid and thence to said third additional disk;
(d) said fourth mechanical means:
(1) in a remote pilot control state allows transmission of torque from said first additional disk to said third additional disk and does not allow transmission of torque from said second additional disk to said third additional disk; and
(2) in an autopilot/flight control system control state, allows transmission of torque from said second additional disk to said third additional disk and does not allow transmission of torque from said first additional disk to said third additional disk.

63. The apparatus defined in claim 62, wherein each of said fluid containing chambers forms a clutch.

64. The apparatus defined in claim 1, further comprising:
(1) four disks, a first one of said disks being mechanically coupled to said mechanically actuated control device such that said first disk rotates in response to on-board pilot actions upon said control device, a second one of said disks being mechanically coupled to said receiving means, a third one of said disks being mechanically coupled to at least one of said autopilot and said flight control system, and a fourth one of said disks being mechanically coupled to said at least one actuator such that the rotation of said fourth disk causes said actuator to move said at least one of said throttle and said control surface;
(2) first mechanical means for the transmission of torque from the rotation of said first disk to said fourth disk, said second disk to said fourth disk, and said third disk to said fourth disk;
(3) second mechanical means for selectively controlling the transmission of said torque from said first disk to said fourth disk, from said second disk to said fourth disk and from said third disk to said fourth disk;
(4) means for producing a second electric signal indicative of the choice of said alternate source of control; and (5) means responsive to said first, and said second electric signals for controlling said second mechanical means;
wherein,
(1) in a first apparatus state, said second mechanical means couples the rotation of said first disk to the rotation of said fourth disk via said first mechanical means, thereby mechanically coupling said on-board pilot to said at least one mechanical actuator;
(2) in a second apparatus state, said second mechanical means couples the rotation of said second disk to the rotation of said fourth disk via said first mechanical means, thereby mechanically coupling said remote pilot to said at least one mechanical actuator;
(3) in a third apparatus state, said second mechanical means couples the rotation of said third disk to the rotation of said fourth disk via said first mechanical means, thereby mechanically coupling said at least one of said autopilot and said flight control system to said at least one mechanical actuator;
(4) a first type of said second electric signal causes said second mechanical means to transmit torque from said second disk to said fourth disk; thereby allowing said remote pilot to control said aircraft;
(5) a second type of said second electric signal causes said second mechanical means to transmit torque from said third disk to said fourth disk, thereby allowing at least one of said autopilot and said flight control system to control said aircraft.

65. The apparatus defined in claim 64, wherein said first mechanical means comprises a fluid containing chamber, said chamber allowing the transmission of torque from one of said first disk, said second disk and said third disk to said fluid and thence to said fourth disk and wherein said second mechanical means selects one of said first disk, said second disk and said third disk for said transmission.

66. The apparatus defined in claim 65, wherein said fluid containing chamber forms a clutch.

67. The apparatus defined in claim 64, wherein:
(a) said first disk is further mechanically coupled to a first gear wheel such that rotation of said first disk causes rotation of said first gear wheel;
(b) said second disk is further mechanically coupled to a second gear wheel such that rotation of said second disk causes rotation of said second gear wheel;
(c) said third disk is further mechanically coupled to a third gear wheel such that rotation of said third disk causes rotation of said third gear wheel;
(d) said fourth disk is further mechanically coupled to a fourth gear wheel such that rotation of said fourth gear wheel causes rotation of said fourth disk;
(e) said first mechanical means controls the relative position of said first gear wheel and said fourth gear wheel, the relative position of said second gear wheel and said fourth gear wheel, and the relative position of said third gear wheel and said fourth gear wheel;
whereby:
(1) in a first apparatus state said second mechanical means causes transmission of torque from said first gear wheel to said fourth gear wheel by causing the meshing of said respective gear wheels, thereby mechanically coupling said on-board pilot to said at least one mechanical actuator;
(2) in a second apparatus state said first type of second electric signal causes said second mechanical means to cause transmission of torque from said second gear wheel to said fourth gear wheel by causing the meshing of said respective gear wheels, thereby mechanically coupling said remote pilot to said at least one mechanical actuator; and
(3) in a third apparatus state said second type of second electric signal causes said second mechanical means to cause transmission of torque from said third gear wheel to said fourth gear wheel by causing the meshing of said respective gear wheels, thereby mechanically coupling said autopilot/flight control system to said at least one mechanical actuator.

68. Apparatus for disabling on-board pilot operation of an aircraft and transferring aircraft operation to an alternate source of control, said aircraft having at least one manually actuated control device for on-board human pilot control of at least one mechanical actuator, said actuator causing movement of one of (1) an aircraft engine throttle and (2) an aircraft attitude control surface, said at least one actuator being mechanically connected to both (1) said at least one control device, and (2) said alternate source of control, said alternate source of control comprising at least one of an autopilot, a flight control system and means for receiving control signals transmitted from a remote station, said signals representing commands by an off-aircraft human pilot, said apparatus comprising, in combination:
(a) means for producing a first electric signal indicative of an emergency condition requiring the disabling of on-board pilot control of said aircraft;
(b) means for mechanically disconnecting said mechanical connection between said at least one control device and said at least one actuator in response to said first electric signal indicative of said emergency condition; and
wherein said alternate source of control controls said aircraft following the receipt of said first electric signal.

69. The apparatus defined in claim 68, wherein means (b) includes (1) at least one removable pin extending through holes in at least two mechanical movable members, each movable member forming a part of one of said at least one control device and said at least one actuator, respectively, and (2) means responsive to said first electric signal for removing said pin, thereby to sever the connection between said movable members, wherein the connection between said alternate source of control and said at least one actuator is maintained following the removal of said at least one pin.

70. The apparatus defined in claim 68, wherein means (b) includes (1) at least one de-couple-able segment linking two portions of a mechanical member that extends between said at least one control device and said at least one actuator, and (2) means responsive to said first electric signal for de-coupling said segment, thereby to de-couple the connection between said at least one control device and said at least one actuator, wherein the connection between said alternate source of control and said at least one actuator is maintained following the de-coupling of said segment.

71. The apparatus defined in claim 70, wherein de-coupling means includes means responsive to said first electric signal for severing said segment, thereby to sever the connection between said at least one control device and said at least one actuator.

72. The apparatus defined in claim 70, wherein said de-coupling means includes means responsive to said first electric signal for removing said segment, thereby to sever the connection between said at least one control device and said at least one actuator.

73. The apparatus defined in claim 68, wherein said receiving means further comprises converting means for converting said received control signals to at least one of translational and rotational motion.

74. The apparatus defined in claim 73 wherein said converting means includes a servo motor linked to said at least one actuator by at least one of a cable, a chain, a cord, and at least one gear.

75. The apparatus defined in claim 68, wherein said mechanical actuator is at least one of a hydraulic and a pneumatic actuator which receives a fluid under pressure from a fluid line, and wherein means (b) includes a valve arranged in said fluid line, responsive to said first electric signal, for interrupting the flow of fluid.

* * * * *